United States Patent
Weiss et al.

(10) Patent No.: US 11,995,597 B1
(45) Date of Patent: *May 28, 2024

(54) GATHERING IN-STORE EMPLOYEE RATINGS USING TRIGGERED FEEDBACK SOLICITATIONS

(71) Applicant: WALGREEN CO., Deerfield, IL (US)

(72) Inventors: Benjamin Weiss, Chicago, IL (US); Timothy P. McCauley, Evanston, IL (US); Nicholas L. Eby, Downers Grove, IL (US)

(73) Assignee: WALGREEN CO., Deerfield, IL (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/548,108

(22) Filed: Dec. 10, 2021

Related U.S. Application Data

(63) Continuation of application No. 16/817,332, filed on Mar. 12, 2020, now Pat. No. 11,232,386, which is a
(Continued)

(51) Int. Cl.
*G06Q 10/0639* (2023.01)
*G06Q 30/02* (2023.01)
(Continued)

(52) U.S. Cl.
CPC ... *G06Q 10/06398* (2013.01); *G06Q 30/0281* (2013.01); *G06Q 30/0282* (2013.01);
(Continued)

(58) Field of Classification Search
None
See application file for complete search history.

(56) References Cited

U.S. PATENT DOCUMENTS

| 8,170,909 B2 | 5/2012 | Brown et al. |
| 9,002,375 B1 | 4/2015 | Lerner et al. |

(Continued)

FOREIGN PATENT DOCUMENTS

CA 2842842 A1 * 1/2013 ......... G01C 21/3469

OTHER PUBLICATIONS

M. Iwai, M. Mori and H. Touda, "A marketing analysis using massive tiny sensor nodes," 2009 Sixth International Conference on Networked Sensing Systems (INSS), Pittsburgh, PA, USA, 2009, pp. 1-4, doi: 10.1109/INSS.2009.5409918. (Year: 2009).*

(Continued)

*Primary Examiner* — Shelby A Turner
(74) *Attorney, Agent, or Firm* — MARSHALL, GERSTEIN & BORUN LLP; Randall G. Rueth

(57) ABSTRACT

Embodiments are disclosed to detect whether an interaction has occurred between a customer and one or more store employees. By analyzing a how long a communication device used by the customer was within a threshold range of one or more devices worn by store employees, an interaction between the customer and one or more store employees may be identified. Employees whom the customer interacted with may be identified by processing transmission parameters broadcasted by the devices worn by the store employees. Thus, all employees in which a customer interacted with while visiting a store may be identified. The customer may be asked for feedback via the communication device upon detection that a customer has completed a transaction and/or left the store. Using the solicited feedback provided by the customer, various types of reports may be generated.

20 Claims, 11 Drawing Sheets

Related U.S. Application Data continuation of application No. 16/545,356, filed on Aug. 20, 2019, now Pat. No. 10,621,536, which is a continuation of application No. 15/717,506, filed on Sep. 27, 2017, now Pat. No. 10,467,573, which is a continuation of application No. 14/456,713, filed on Aug. 11, 2014, now Pat. No. 9,824,323.

(51) Int. Cl.
*G06Q 30/0282* (2023.01)
*H04W 4/02* (2018.01)
*G06Q 20/32* (2012.01)

(52) U.S. Cl.
CPC ........ *H04W 4/02* (2013.01); *G06Q 10/06393* (2013.01); *G06Q 20/3274* (2013.01)

(56) References Cited

U.S. PATENT DOCUMENTS

| | | | |
|---|---|---|---|
| 9,264,151 B1 | 2/2016 | Emigh et al. | |
| 9,311,668 B2 | 4/2016 | Pedley et al. | |
| 10,089,326 B2 | 10/2018 | Mazniker et al. | |
| 2007/0184852 A1 | 8/2007 | Johnson et al. | |
| 2008/0097769 A1 | 4/2008 | Galvin et al. | |
| 2008/0149721 A1 | 6/2008 | Shadwell | |
| 2008/0255929 A1 | 10/2008 | Mouton | |
| 2009/0112683 A1 | 4/2009 | Hamilton, II et al. | |
| 2010/0038416 A1 | 2/2010 | Canora | |
| 2010/0161356 A1 | 6/2010 | Louie et al. | |
| 2010/0280911 A1 | 11/2010 | Roberts et al. | |
| 2011/0028161 A1 | 2/2011 | Larsen | |
| 2011/0238517 A1 | 9/2011 | Ramalingam et al. | |
| 2012/0115512 A1 | 5/2012 | Grainger et al. | |
| 2013/0006663 A1 | 1/2013 | Bertha et al. | |
| 2013/0006718 A1 | 1/2013 | Nielsen et al. | |
| 2013/0173404 A1 | 7/2013 | Scipioni | |
| 2013/0225199 A1 | 8/2013 | Shaw | |
| 2013/0226704 A1* | 8/2013 | Fernandez | G06Q 30/0267 705/14.58 |
| 2013/0317944 A1 | 11/2013 | Huang et al. | |
| 2013/0339105 A1* | 12/2013 | Russell | G06Q 10/0639 705/7.42 |
| 2014/0054381 A1 | 2/2014 | Cha et al. | |
| 2014/0089111 A1 | 3/2014 | Fernandez | |
| 2014/0114877 A1 | 4/2014 | Montano | |
| 2014/0132400 A1 | 5/2014 | Heaven et al. | |
| 2014/0143025 A1 | 5/2014 | Fish et al. | |
| 2014/0143060 A1 | 5/2014 | Fernandez | |
| 2014/0156426 A1 | 6/2014 | Morgan et al. | |
| 2014/0180817 A1 | 6/2014 | Zilkha | |
| 2014/0200937 A1 | 7/2014 | Friedman | |
| 2014/0244834 A1 | 8/2014 | Guedalia et al. | |
| 2014/0259189 A1 | 9/2014 | Ramachandran | |
| 2014/0279269 A1* | 9/2014 | Brantley | G06Q 30/0635 705/26.81 |
| 2014/0279541 A1 | 9/2014 | Castrechini et al. | |
| 2014/0324527 A1* | 10/2014 | Kulkarni | G06Q 30/0261 705/7.29 |
| 2014/0351033 A1 | 11/2014 | Azevedo | |
| 2014/0365304 A1 | 12/2014 | Showers et al. | |
| 2015/0006263 A1 | 1/2015 | Heier | |
| 2015/0081474 A1 | 3/2015 | Kostka et al. | |
| 2015/0095161 A1 | 4/2015 | Goel | |
| 2015/0112774 A1 | 4/2015 | Georgoff et al. | |
| 2015/0134429 A1 | 5/2015 | Katakwar et al. | |
| 2015/0178798 A1 | 6/2015 | Garforth-Bles | |
| 2015/0193794 A1 | 7/2015 | Douglas et al. | |
| 2015/0221010 A1 | 8/2015 | Ming | |
| 2015/0227949 A1 | 8/2015 | Sangani | |
| 2015/0235161 A1 | 8/2015 | Azar et al. | |
| 2015/0269624 A1 | 9/2015 | Cheng et al. | |
| 2015/0287063 A1 | 10/2015 | Meyer et al. | |
| 2015/0294084 A1 | 10/2015 | McCauley et al. | |
| 2015/0348003 A1 | 12/2015 | Reader | |
| 2015/0358423 A1 | 12/2015 | L'Heureux et al. | |
| 2015/0363816 A1 | 12/2015 | Poglitsch | |
| 2016/0012495 A1* | 1/2016 | Hanson | H04W 4/029 705/346 |
| 2017/0046753 A1 | 2/2017 | Deupree, IV | |
| 2018/0315110 A1 | 11/2018 | Kannan et al. | |

OTHER PUBLICATIONS

W. Z. Khan, Y. Xiang, M. Y. Aalsalem and Q. Arshad, "Mobile Phone Sensing Systems: A Survey," in IEEE Communications Surveys & Tutorials, vol. 15, No. 1, pp. 402-427, First Quarter 2013, doi: 10.1109/SURV.2012.031412.00077 (Year: 2013).*

W. Shi, J. Yang, Yifei Jiang, Feng Yang and Yingen Xiong, "SenGuard: Passive user identification on smartphones using multiple sensors," 2011 IEEE 7th International Conference on Wireless and Mobile Computing, Networking and Communications (WiMob), 2011, pp. 141-148, doi: 10.1109/WiMOB.2011.6085412. (Year: 2011).

Anonymous, "A Storage System, Method and Data Structure for a Codified Customer Experience", IP.conn Prior Art Database, US, (Jan. 7, 2010), online: https://ip.conn/IPCOM/000191554 (Year: 2010).

N. Eagle and A. Pentland, "Social serendipity: mobilizing social software," in IEEE Pervasive Computing, vol. 4, No. 2, pp. 28-34, Jan.-Mar. 2005, doi: 10.1109/MPRV.2005.37 (Year: 2005).

* cited by examiner

GATHERING IN-STORE EMPLOYEE RATINGS USING TRIGGERED FEEDBACK SOLICITATIONS

CROSS-REFERENCE TO RELATED APPLICATIONS

This application is a continuation of U.S. patent application Ser. No. 16/817,332, filed Mar. 12, 2020, which is a continuation of U.S. patent application Ser. No. 16/545,356, filed Aug. 20, 2019; which is a continuation of U.S. patent application Ser. No. 15/717,506, filed Sep. 27, 2017; which is a continuation of U.S. patent application Ser. No. 14/456,713, filed Aug. 11, 2014; each of which are incorporated herein by reference in their entirety.

TECHNICAL FIELD

The present disclosure relates generally to gathering employee feedback and, more particularly, to identifying store employees and soliciting employee feedback once a customer has finished shopping.

BACKGROUND

In many cases, a customer may enter a store and interact with a number of store employees to purchase an item. The customer may have a good or bad experience based on this interaction, whether the sought-after item was available for purchase, or other circumstances. This type of information may provide valuable insight for store management to improve future customer experiences.

Many times, stores try to gather customer feedback by sending requests to customers via email, which may have been provided by the customer when enrolling in a loyalty rewards program, signing up for purchasing incentives, etc. Additionally, stores may request customer feedback once the customer has made an online purchase, which may be requested upon online checkout or emailed to the customer after the purchase has been completed.

However, collecting feedback from customers in this way has several drawbacks. First, a customer may not be prompted for feedback if the customer has not purchased anything. In other words, because typical feedback systems rely on generating feedback when a customer purchases an item, customers visiting a store but leaving dissatisfied after being unable to make a purchase are never asked for feedback. Since customers leaving stores without purchasing an item are likely to be unsatisfied with their experience, not obtaining this feedback may potentially skew feedback by excluding a large number of negative customer experiences, thereby giving many stores a false perception of customer satisfaction.

Second, when customers do purchase items and feedback is solicited, the customer may not remember details identifying the employees in which the customer interacted. Therefore, although feedback may be gathered from purchasing customers, details that may be important to correct bad customer experiences with particular employees and/or stores may never be determined.

As a result, gathering detailed feedback from customers based on their shopping experience with particular store employees regardless of whether a customer makes a purchase in the store is important but presents several challenges.

SUMMARY

In some embodiments, methods, apparatus, and non-transitory media are described that detect a proximity of a first communication device to both a store location and to a second communication device that may be worn by, affixed to, or otherwise associated with a store employee. In such embodiments, the first communication device may determine whether the customer has interacted with an employee based on the distance, or range, between the first and second communication devices being less than a threshold range for greater than a threshold window of time. In such embodiments, information transmitted from the second communication device may include a store employee identifier. The first communication device may determine that a triggering event has occurred or the first communication device may receive a trigger notification from an external device upon the occurrence of one or more triggering events, such as leaving the store or purchasing an item. In response to determining or receiving the triggering event, the external device may send a notification to the first communication device soliciting feedback from the customer, which may include a numerical rating system and/or allow the customer to enter comments. The customer may then submit the feedback and/or comments to the external device, which may also include details such as the employee identification numbers of store employees that the customer had interacted with while shopping, store identifying information, a duration of each interaction between the customer and store employee, etc.

In additional embodiments, methods, apparatus, and non-transitory media are described that aggregate and/or format the feedback data gathered from the customer to provide varying types of reports for different levels of store management. In such embodiments, the feedback data for each employee may be sent directly to each store employee, providing the employees with a direct and unbiased feedback from those customers the store employees have interacted in the past day, week, month, etc. Furthermore, embodiments include the averaging feedback data scores for all store employees within a particular store, region, chain, etc. to provide feedback to the appropriate levels of managements.

In additional embodiments, methods, apparatus, and non-transitory media are described that utilize the feedback data in conjunction with a bonus system, thereby providing employees automated spot bonuses when average feedback ratings exceed a threshold rating over a particular period of time.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Figure 1:
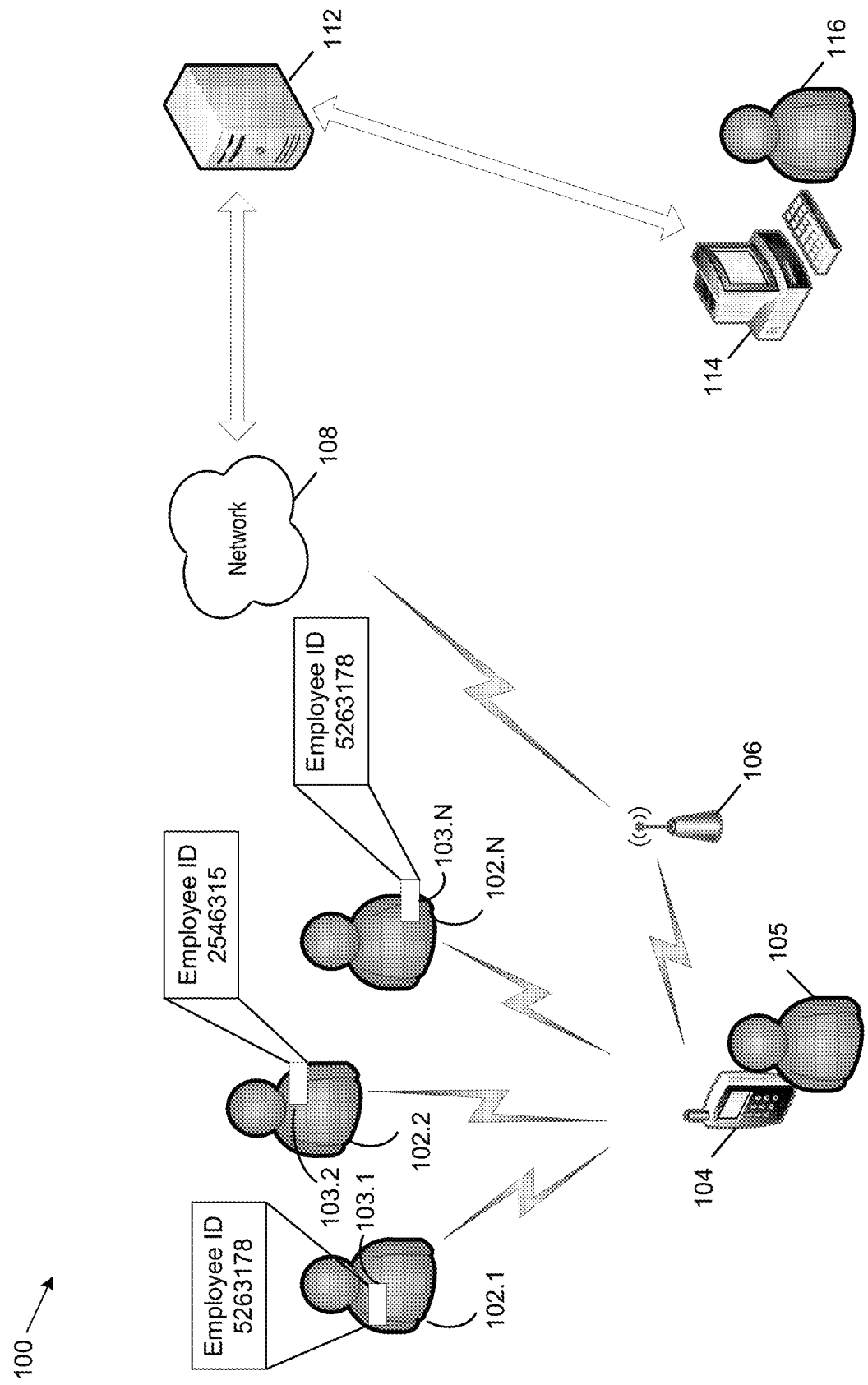
FIG. 1 is a block diagram of an exemplary feedback solicitation system 100 in accordance with an embodiment of the present disclosure.

FIG. 1 is a block diagram of an exemplary feedback solicitation system 100 in accordance with an embodiment of the present disclosure. Feedback solicitation system 100 includes 'N' number of employees 102.1-102.N associated with N number of respective communication devices 103.1-101.N, a communication device 104, which may be operated by a user 105, such as a customer, for example, a base station 106, a network 108, an external device 112, and a store checkout system 114, which may be operated by a user 116, such as a store cashier, for example.

Communication devices 103.1-103.N may be configured to store any suitable number of parameters, such as unique identifiers, location identifiers, employee identifiers, and/or store identifiers, for example, and to broadcast these parameters as part of each communication device 103's respective transmission. In various embodiments, communication devices 103.1-103.N may be configured to broadcast transmissions in accordance with any suitable recurring schedule, such as once per every 10 seconds, once per 30 seconds, etc. In various embodiments, communication devices 103.1-103.N may be implemented as a wireless communication device worn by the employee, such as a watch, bracelet, badge, etc. In an embodiment, one or more of communication devices 103.1-103.N may be integrated with an employee badge that is worn by the respective store employee 102 and may include the employee's name, title, or other information. In this way, communication devices 103.1-103.N may be worn as part of the employee's ordinary work attire.

In various embodiments, the parameters may be stored in any suitable memory device utilized by the respective communication device 103, such as a flash-based memory, a battery-backed RAM, etc. In some embodiments, communication devices 103.1-103.N are configured to broadcast beacons in accordance with one or more communication protocols and/or standards, such as IEEE Standards, for example.

In some embodiments, communication devices 103.1-103.N may be configured to transmit their respective parameters in accordance with a communication protocol, such as radio frequency identification (RFID) and/or a near field communication (NFC) protocol. To provide another example, communication devices 103.1-103.N may be configured to transmit their respective parameters in accordance with a Wi-Fi communication protocol. Wi-Fi protocols could include ad-hoc communications, such as Wi-Fi direct, for example, such that direct communications is facilitated between communication devices 103.1-103.N and communication device 104. As will be appreciated by those of ordinary skill in the relevant art(s), communication devices 103.1-103.N may be implemented with any suitable number of power sources, wireless transmitters, receivers, and/or transceivers, processors, memories, etc., to facilitate this functionality.

In accordance with such an embodiment, each beacon broadcasted by a respective communication device 103 may include a respective universally unique identifier (UUID). In some embodiments, communication devices 103.1-103.N may be implemented as iBeacons, which have been developed by Apple, Inc. In accordance with such an embodiment, communication devices 103.1-103.N may be configured to transmit their respective UUIDs in accordance with one or more standards utilized by iBeacon devices. For example, communication devices 103.1-103.N may transmit their respective UUIDs in accordance with a BLUETOOTH Low Energy (BLE) protocol, which implements the BLUETOOTH 4.0 specification at the time of this writing.

In some embodiments, communication devices 103.1-103.N may be configured to operate in an advertising mode in which communication devices 103.1-103.N only transmit their respective beacons and do not otherwise receive communications. In other embodiments, communication devices 103.1-103.N may be configured to transmit their respective beacons and to receive communications from other communication devices, such as communication device 104, for example. Embodiments in which communication devices 103.1-103.N only transmit their respective beacons could be particularly useful when they are implemented as devices that utilize a battery power source, as such a configuration advantageously reduces power consumption.

In some embodiments, the transmitted parameters may also include any suitable type of identifier. For example, a portion of the transmitted parameters could correspond to a particular store location and be common among all communication devices 103.1-103.N positioned within a single store, while another portion of the transmitted parameters may function to uniquely identify each communication device 103. Because each employee is assigned her own communication device 103, in various embodiments an employee may be identified either via a correlation of the identified communication device 103 to the employee assigned to that device, or simply by receiving the employee ID from the communication device 103 that was transmitted as part of the beacon parameters.

In various embodiments, the transmitted parameters may also include data representative of calibrated receive power information. For example, iBeacons broadcast a power value that is a calibrated received signal strength indicator (RSSI) measured 1 meter from the communication device by another communication device. By broadcasting this calibrated receive power value, another device (e.g., communication device 104) can compare the RSSI of a received beacon transmission to the calibrated value and use this ratio to estimate its proximity to the communication device 103 transmitting the beacon.

Communication device 104 may be configured to communicate with one or more of communication devices 103.1-103.N and to receive parameters transmitted from one or more of communication devices 103.1-103.N. Communication device 104 may be configured to communicate with network 108 via base station 106. As will be appreciated by those of ordinary skill in the relevant art(s), communication device 104 may be implemented with any suitable number of power sources, wireless transmitters, receivers and/or transceivers, processors, memories, etc., to facilitate this functionality. In an embodiment, communication device 104 is implemented as a user equipment (UE), such as a smartphone, for example. Although communication device 104 is illustrated in FIG. 1 as a phone, communication device 104 may be implemented as any suitable communication device configured to communicate with communication devices 103.1-103.N and network 108. For example, communication device 104 may be implemented as a smartphone, a personal digital assistant (PDA), a tablet computer, a laptop computer, etc. Communication device 104 may be configured to communicate with base station 106 via any suitable communications protocol to access network 108, such as cellular or Wi-Fi protocols, for example.

In various embodiments, communication device 104 may be configured to detect its proximity to a store in which employees 102.1-102.N work. Based on this proximity, embodiments include communication device 104 performing one or more context-based actions. For example, communication device 104 may be configured to receive location beacons transmitted by other suitable communication devices located within the same store in which employees 102.1-102.N are working in addition to communication devices 103.1-103.N.

Although communication devices in addition to communication devices 103.1-103.N are not shown in FIG. 1 for purposes of brevity, communication device 104 may utilize communications with such additional communication devices located in the store to determine its proximity to a particular store. These other communication devices may be additional beacon devices, for example, which are utilized for this purpose. In various embodiments, communication 104 may detect its proximity within a store utilizing any techniques described in commonly assigned and co-pending U.S. application Ser. No. 14/249,492, which was filed on Apr. 10, 2014, and is fully incorporated herein by reference in its entirety.

To provide another example of location determination, communication device 104 may implement any suitable number of global navigation satellite system (GNSS) and/or other suitable types of receivers to obtain its geographic location. Communication device 104 may be configured to determine its respective position via network triangulation, global positioning system (GPS) location techniques, assisted-GPS (A-GPS) techniques, etc. In accordance with various embodiments, communication device 104 may determine its proximity to a store based on a comparison of this geographic location to a geofenced area that is associated with the store location.

The proximity of communication device 104 to a particular store location may act as a trigger to launch one or more background applications as a context-based action. Once the one or more background applications are running, communication device 104 may automatically listen for incoming beacons transmitted by devices 103.1-103.N without any user intervention. For example, a user may have communication device 104 in his pocket and walk into a store in which employees 102.1-102.N are working. Without any user intervention, communication device 104 may determine that it is proximate to the store using any of the aforementioned techniques and start a background application that listens for beacons that may be broadcasted by communication devices 103.1-103.N.

Once a background application has been launched on communication device 104, in various embodiments, communication device 104 may determine whether the customer has "interacted" with one or more of store employees 102.1-102.N. In various embodiments, communication device 104 may be configured to determine whether an interaction occurred based on whether communication device 104 was within a threshold range of one of communication devices 103.1-13.N for a threshold time period.

For example, communication device 104 may utilize calibrated receive power information received from any of communication devices 103.1-103.N when communication device 104 comes within receiving range of one or more of communication devices 103.1-103.N. Communication device 104 may compare the RSSI of the received beacon measured at communication device 104 to the calibrated value and use this ratio to estimate the distance between communication device 104 and one or more of communication devices 103.1-103.N based on known path-loss signal transmission models.

To provide another example, communication device 104 may utilize a detection range, such as a maximum range in which another communications device may be detected, for example, to determine an interaction between the customer and employee. Embodiments of detection range applications may be particularly useful, for example, when communication device 104 implements near field communications to detect its proximity to one or more of communication devices 103.1-103.N. In other words, because maximum NFC ranges are typically about 20 cm, embodiments could include communication device 104 determining that a customer has interacted with a store employee when an NFC compatible communication device 103.1-103.N is simply detected in accordance with suitable NFC communication protocols, which would signify that communication device 104 and one or more of communication devices 103.1-103.N are within at least this typical maximum NFC range of one another.

In various embodiments, communication device 104 may log a record of each interaction between communication devices 103.1-103.N, and thus the interactions between the customer and any of store employees 102.1-102.N. Additionally or alternatively, various embodiments include communication device 104 also logging other suitable details corresponding to employee-customer interactions, such as a timestamp for each interaction, a duration of each interaction, a duration of the total time communication device 104 was within a minimum range (e.g., on the threshold of detection) of a communication device 103, store identification information, etc.

While customer 105 continues to shop and have various interactions with store employees 102.1-102.N, communication device 104 may continue to record the details associated with each interaction. Once the customer has finished shopping, one or more trigger conditions may result in a notification being pushed to communication device 104 to solicit feedback from customer 105. Additionally or alternatively, communication device 104 may generate the notification to solicit feedback from customer 105. The one or more trigger conditions may be a result of customer 105 exiting the store and/or completing a transaction.

For example, communication device 104 may determine its location and send this information to external computing device 112 via base station 106 and network 108. External computing device 112, in turn, may determine that communication device 104 has left the vicinity of a particular store using this location information. In various embodiments, external computing device 112 may determine that customer 105 has left the store by referencing location information received from communication device 104 to geofencing data associated with a perimeter of a particular store.

To provide another example, external computing device 112 may determine that communication device 104 has left the vicinity of a store based on location beacon data received by communication device 104 from another communication device (not shown in FIG. 1) and reported to external computing device 112 from communication device 104, as further described in application Ser. No. 14/249,492, for example. By pushing a feedback notification to communication device 104 based on its location, customer 105 may be given the opportunity to provide feedback regardless of whether customer 105 purchased an item.

To provide yet another example, a push notification may be sent to communication device 104 as result of customer 105 completing a transaction at checkout system 114. In some embodiments, checkout system 114 may be configured to send notifications to external computing device 112 when items are purchased by customers participating in a rewards program, or who are otherwise identifiable upon checkout. Once customer 105 provides this information, which is typically presented and scanned by the cashier 116 in the form of a barcode, checkout system 114 may send data identifying customer 105 to external computing device 112. If customer 105 provided a cell number when enrolling in a loyalty rewards program or other suitable program and gave consent to receive push notifications from the retailer, then external computing device 112 may push a notification soliciting feedback from customer 105 upon customer 105 scanning such information at checkout system 114.

In other embodiments, communication device 104 may generate the feedback notification to solicit feedback from customer 105 without receiving a push notification. For example, a rewards card or other applicable customer participation program may identify customer 105 as a displayed barcode, QR code, etc., on a suitable display portion of communication device 104. Additionally, communication device 104 may implement a front-facing camera, i.e., a camera on the same side of communication device 104 as the portion displaying the rewards barcode. In such a scenario, embodiments include detecting a laser barcode scan of the displayed barcode using the camera integrated into communication device 104. For example, rapid changes in the red value in the RGB spectrum may indicate the presence of a laser scanning device. In various embodiments, communication device 104 may display the feedback notification to customer 105 shortly after the barcode scanner is detected, such as 30 seconds later, a minute later, etc.

Base station 106 is configured to facilitate communications between communication device 104 and network 108. Although base station 106 is illustrated in FIG. 1 as wirelessly communicating with network 108, embodiments include communication device 104 providing communications to network 108 via any suitable number of wired and/or wireless links. For example, base station 106 may be coupled to network 108 via one or more landline, internet service provider (ISP) backbone connections, satellite links, a public switched telephone network (PSTN), etc. In various embodiments, base station 106 can be implemented as an access point (AP), a macrocell, a femtocell, etc.

Network 108 may include any suitable number of nodes, additional wired and/or wireless networks, etc., in various embodiments. For example, in an embodiment, network 108 may be implemented as a local area network (LAN) or a suitable combination of local and/or external network connections. In various embodiments, network 108 may provide communication device 104 with connectivity to network services, such as Internet services and/or access to external computing device 112. Although one external computing device 112 is shown in FIG. 1, network 108 may include connections to any suitable number of remote devices, servers, nodes, terminals, etc.

In an embodiment, external computing device 112 may be configured to communicate with communication device 104 via network 108 and base station 106. In an embodiment, external computing device may be configured to communication with checkout system 114 via any suitable number of wired and/or wireless links. In various embodiments, external computing device 112 may be implemented as a web server, a cloud server, etc. External computing device 112 may be configured to perform any suitable portion of processing operations otherwise performed by communications device 104. External computing device 112 may include any suitable number of processors, memories, databases, etc., to facilitate this functionality.

In an embodiment, external computing device 112 may be configured to receive data from communication device 104 and/or checkout system 114 to determine an occurrence of trigger conditions. External computing device 112 may be configured to generate notifications and send these notifications to communication device 104 in response to determining that a trigger condition has occurred and/or receiving such an indication from another device, such as via checkout system 114, for example. In accordance with an embodiment, external computing device 112 may be configured to generate and to send push notifications via network 108 to communication device 104. As previously discussed with reference to the one or more links between base station 106 and network 108, communications between external computing device 112 and network 108 may be implemented with any suitable number of wired and/or wireless links.

External computing device 112 may be configured to store and/or access information from one or more databases, which are not shown in FIG. 1 for purposes of brevity. The information stored and/or accessed by external computing device 112 may include, for example, customer information, reward program or other suitable program information, store information, store employee information, store location information, or any other suitable relevant information used to determine trigger conditions as described in the embodiments presented herein. In various embodiments, the one or more databases may be integrated as a part of external computing device 112 or separate from external computing device 112.

Once a trigger condition is determined by external computing device 112 and a notification is pushed to communication device 104, customer 105 may enter feedback as indicated on an appropriate display portion of communication device 104. As will be further discussed below, the feedback may include a numerical rating and/or comments entered by customer 105. Once customer 105 enters the feedback, the feedback data, which may include a rating and/or comments entered by customer 105, as well as any logged data, which may include store information, employee interaction information, timestamps associated with each interaction, etc., are sent from communication device 104 to external computing device 112.

In various embodiments, external computing device 112 may generate a series of reports using the data received from communication device 104, which may include the feedback data and any additional logged data regarding the interactions between customer 105 and one or more of store employees 102.1-1021.N. As will be further discussed below, these reports may be targeted to various levels of store management. For example, external computing device 112 may send reports to each store employee 103.1-103.N, which may include each employees average rating or score for a given time period. As external computing device 112 may be made available to the various levels of management, store employee feedback may be used for a variety of purposes, such as reviews, disciplinary action, spot bonuses, etc.

Checkout system 114 may be configured to communicate with external computing device 112. Although FIG. 1 illustrates checkout system 114 as having a direct connection to external computing device 112, various embodiments include checkout system 114 being connected to external computing device 112 via network 108. Checkout system 114 may function as a point of sale (POS) within the store, and therefore may be configured to identify items to be purchased by customer 105 and process payments.

As previously discussed, checkout system 114 may send rewards program information scanned for customer 105 to external computing device 112. In various embodiments, checkout system 114 may access external computing device 112, databases integrated as a part of checkout system 114, and/or databases separate from checkout system 114, to determine pricing information, customer rewards point status, available discounts, run reports, determine store inventory and corresponding locations, etc.

Figure 2:
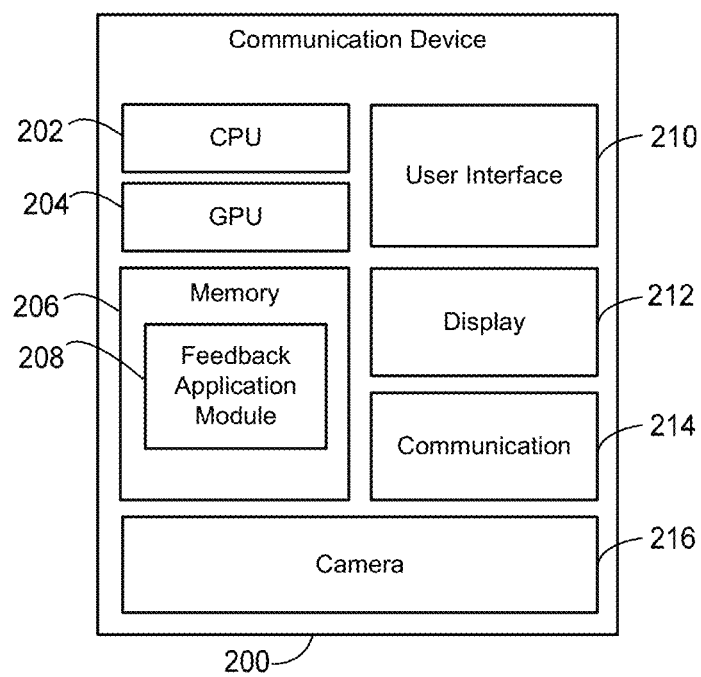
FIG. 2 is a block diagram of an exemplary communication device 200 configured to run a feedback application, according to an embodiment.

FIG. 2 is a block diagram of an exemplary communication device 200 configured to run a feedback application, according to an embodiment. For ease of explanation, communication device 200 will be described with reference to communication device 104 of FIG. 1. However, communication device 200 may be implemented as a communications device other than communication device 104 and/or as part of a system other than exemplary feedback generation system 100.

Communication device 200 includes a central processing unit (CPU) 202, a graphics processing unit (GPU) 204, a memory 206, a user interface 210, a display 212, a communication unit 214, and a camera unit 216. In an embodiment, communication device 200 is implemented as a user equipment (UE), such as a mobile computing device, a smartphone, a laptop computer, tablet computer, desktop computer, or any other suitable type of computing device.

Communication unit 214 may be configured to facilitate data communications between communication device 200 and one or more other devices, such as one or more of communication devices 103.1-103.N and/or external computing device 112, as shown in FIG. 1, for example. In an embodiment, communication unit 214 may be configured to receive data, such as transmission parameters and/or other identifying information, for example, from one or more communications devices, such as communication devices 103.1-103.N, for example, as shown in FIG. 1. In an embodiment, communication device 200 may be configured to send data, including location data and/or customer information, for example, to another device, such as external computing device 112, for example, as shown in FIG. 1.

As will be appreciated by those of ordinary skill in the relevant art(s), communication unit 214 may be implemented with any combination of suitable hardware and/or software to enable these functions. For example, communication unit 214 may be implemented with any number of wired and/or wireless transceivers, antennas, network interfaces, physical layers (PHY), etc. In embodiments in which communication device 200 is a mobile computing device, communication unit 214 optionally enables communications between communication device 200 and one or more networks, such as network 108, for example, as shown in FIG. 1.

In various embodiments, communication unit 214 is configured to measure the strength of signals and to provide these measurements to CPU 202. For example, in embodiments in which communication device 200 is implemented as a mobile computing device, communication unit 214 may be configured to measure the strength of signals received from other communication devices, such as communication devices 103.1-103.N, for example, as shown in FIG. 1. In this way, communication unit 214 may provide CPU 202 a way of determining a distance, or range, between communication device 200 and one or more of communication devices 103.1-103.N based on the strength of received beacon transmissions broadcasted by communication devices 103.1-103.N. Alternatively or additionally, communication unit 214 may be configured to measure the strengths of signals received from one or more base stations, such as base station 106, for example, as shown in FIG. 1.

In various embodiments, communication unit 214 is configured to determine whether communication device 200 is within range of one or more communications devices, such as communication devices 103.1-103.N, for example, as shown in FIG. 1. For example, in embodiments in which communication device 200 is implemented as a mobile computing device with NFC communications, communication unit 214 may be configured to detect the presence of one or more NFC compatible communication devices 103.1-103.N when one or more of communication devices 103.1-103.N is within NFC range of communication device 200. In this way, communication unit 214 may provide CPU 202 a way to determine whether communication device 200 and one or more of communication devices 103.1-103.N are at least within NFC detection range of one another.

User interface 210 may be configured to allow a user to interact with communication device 200. For example, user interface 210 may include a user-input device such as an interactive portion of display 212 (e.g., a "soft" keyboard displayed on display 212), an external hardware keyboard configured to communicate with communication device 200 via a wired or a wireless connection (e.g., a Bluetooth keyboard), an external mouse, and/or any other suitable user-input device.

CPU 202 and/or GPU 204 may be configured to communicate with memory 206 to store to and read data from memory 206. In accordance with various embodiments, memory 206 is a computer-readable non-transitory storage device that may include any combination of volatile (e.g., a random access memory (RAM), or a non-volatile memory (e.g., battery-backed RAM, FLASH, etc.). Memory 206 may be configured to store instructions executable on CPU 202 and/or GPU 204. These instructions may include machine readable instructions that, when executed by CPU 204 and/or GPU 204, cause CPU 202 and/or GPU 204 to perform various acts. Memory 206 may be configured to store other information, for example, such as store locations, store numbers, a list of UUIDs and their corresponding employee identifiers, customer loyalty program information, customer contact information, etc.

In various embodiments, CPU 202 and/or GPU 204 may be configured to determine a current time from a real-time clock circuit and/or by receiving a network time via communication unit 214 (e.g., via base station 106). Furthermore, various embodiments include CPU 202 and/or GPU 204 maintaining a running clock and/or a timer. Various embodiments include CPU 202 and/or GPU 204 referencing and/or logging interactions between communication device 104 and one or more of communication devices 103.1-103.N by referencing this running clock and/or timer.

Feedback application module 208 is a portion of memory 206 configured to store instructions, that when executed by CPU 202 and/or GPU 204, cause CPU 202 and/or GPU 204 to perform various acts in accordance with a feedback application. For example, in various embodiments, instructions stored in feedback application module 208 may facilitate CPU 204 and/or GPU 204 determining employee-customer interactions, logging any interactions, determining the occurrence of one or more conditions that may trigger a feedback prompt being displayed to the customer, displaying one or more feedback prompts, collecting customer feedback, and/or sending the feedback and any other suitable logged information to another device as specified by the particular feedback application and/or program. As will be appreciated by those of ordinary skill in the relevant art(s), CPU 202 and/or GPU 204 may access instructions stored in feedback application module 208 to implement any suitable number of routines, algorithms, applications, programs, etc., to facilitate the functionality as described herein with respect to the applicable embodiments.

For example, instructions stored in feedback application module 208 may enable CPU 202, in conjunction with communication device 214, to determine whether a customer has entered the vicinity of a particular store by referencing a current location of communication device 200 with geofencing data stored in memory 206. Upon this determination, instructions stored in feedback application module 208 may enable CPU 202 to execute instructions stored in feedback application module 208 and to launch an application as a background process that is transparent to the user. Once this background process is running, instructions stored in feedback application module 208 may enable CPU 202 to determine whether interactions have occurred between communication device 200 and one or more communication devices that are broadcasting transmission parameters, such as one or more of communication devices 103.1-103.N, for example, as shown in FIG. 1. In accordance with such an embodiment, instructions stored in feedback application module 208 may further enable CPU 202 to store data in memory 206 regarding details of the interactions, such as interaction durations, ranges, employee identification numbers, timestamps, etc.

Furthermore, instructions stored in feedback application module 208 may facilitate the CPU 202 to recognize the occurrence of one or more trigger conditions, detection of which resulting in CPU 204 and/or GPU 204 causing display 212 to display a feedback prompt for the customer to complete. As previously discussed with reference to FIG. 1, these trigger conditions may be generated by communication device 200 (e.g., via communications between CPU and camera unit 216) or received as a notification (e.g., a push notification) from an external device or server (e.g., external computing device 112) via communications received via communications unit 214. Additionally, instructions stored in feedback application module 208 may facilitate CPU 202 working in conjunction with communication unit 214 to send data to an external computing device, such as external computing device 112, for example, as shown in FIG. 1. The data may include, for example, feedback data received from customer 105 via user interface 210 and/or any logged data from one or more identified interactions, such as the duration of interactions, etc.

In various embodiments, the information and/or instructions stored in feedback application module 208 may be setup upon the initial installation of a corresponding application. In some embodiments, the feedback application may be installed in addition to an operating system implemented by communication device 200. For example, a user may download and install the feedback application from an application store via communication unit 214 in conjunction with user interface 210. Application stores could include, for example, Apple Inc.'s App Store, Google Inc.'s Google Play, Microsoft Inc.'s Windows Phone Store, etc., depending on the applicable operating system implemented by communication device 200.

In various embodiments, the information and/or instructions stored in feedback application module 208 may be integrated as a part of the operating system implemented by communication device 200. For example, a user could setup the feedback application via an initial setup procedure upon initialization of the communication device, as part of setting up a new user account on the communication device, etc.

Camera unit 216 may be configured to capture pictures and/or videos. Camera unit 216 may be operated by a user in conjunction with user interface 210 and/or display 212. As will be appreciated by those of ordinary skill in the relevant art(s), camera unit 216 may include any suitable combination of hardware and/or software such as image sensors, optical stabilizers, charge-coupled devices (CCDs), etc., to facilitate this functionality. In an embodiment, camera unit 216 may be configured to detect rapid changes in the red value of one or more integrated image sensors, such that scanning of a barcode displayed on display 212 may be detected, as previously discussed with reference to FIG. 1.

Although each of the components in FIG. 2 are illustrated as separate units or modules, those of ordinary skill in the relevant art(s) will appreciate that any components integrated as part of communication unit 200 shown in FIG. 2 may be combined and/or share functionalities. For example, CPU 202, GPU 204, and memory 206 may be integrated as a single chip processing unit. Furthermore, although connections are not shown between the individual components of communication unit 200, those of ordinary skill in the relevant art(s) will appreciate that communication unit 200 may implement any suitable number of wired and/or wireless links to facilitate communication and interoperability between these components. For example, memory 206, communication unit 214, display 212, and/or camera 216 may be coupled via wired buses and/or wireless links to CPU 202, GPU 204, and/or memory 206 to facilitate communications between these components and to enable these components to accomplish the functions associated with the embodiments as described throughout the present disclosure. Furthermore, although FIG. 2 illustrates a single memory 206, those of ordinary skill in the relevant art(s) will appreciate that communication device 200 may implement any suitable number and/or combination of memory systems.

Figure 3:
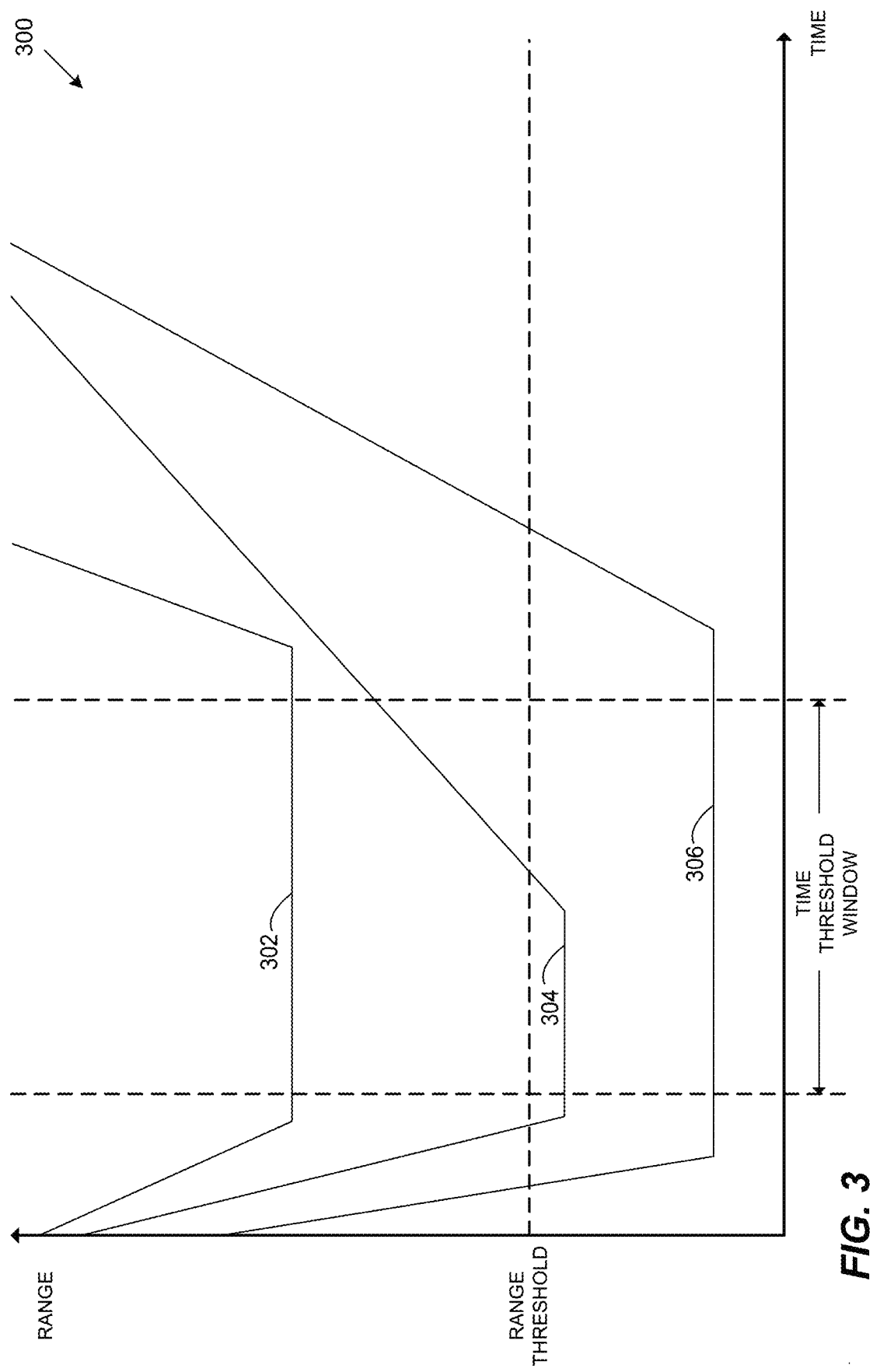
FIG. 3 illustrates a graphical representation 300 of various interaction scenarios between a customer and a store employee, according to an embodiment.

FIG. 3 illustrates a graph 300 of various interaction scenarios between a customer and a store employee, according to an embodiment. In various embodiments, a communication device, such as communication device 104 or communication device 200, for example, as shown in FIGS. 1 and 2, respectively, may be configured to determine whether an interaction has occurred between a customer and one or more store employees. Although both communication device 104 and communication device 200 (which could be embodiments of the same device) may be configured to perform this functionality, the following discussion uses communication device 104 as a reference for brevity.

As previously discussed with reference to FIGS. 1 and 2, communication unit 104 may be configured to determine a range between itself and another communication unit worn by or otherwise associated with a store employee, such as communication units 103.1-103.N, for example, as shown in FIG. 1. As will be appreciated by those of ordinary skill in the relevant art(s), various techniques may be utilized by communication device 104 to determine this range. For example, communication device 104 may estimate the range from an RSSI value calculated for a received beacon signal transmitted by communication device 103. As previously discussed with reference to FIG. 1, the iBeacon standard may transmit beacons including information regarding calibrated receive power measurements, which may be used by communication device 104 to calculate a range, or distance, between itself and a particular communication device 103.

Furthermore, communication device 104 may maintain a count, or timed duration, compared to the current calculated range values. Graph 300 shows three scenarios of potential interactions between a customer 105 and a store employee 102 based on the assumption that the store employee and the customer are both wearing or otherwise associated with their respective communication devices 104 and 103.

In some embodiments, the determination of whether interactions have occurred between the customer and any store employees may be determined by communication device 104. These embodiments may be particularly useful when it is desirable to send less data from communication device 104 to external computing device 112, as these embodiments may include only sending data corresponding to identified interactions.

In other embodiments, the determination of whether interactions have occurred between the customer and any store employees may be determined by external computing device 112. These embodiments may be particularly useful when, for example, it may be desirable to offload processing from communication device 104 at the expense of increased data transmissions.

Regardless of whether communication device 104 or external computing device 112 determines whether interactions have occurred between the customer and the store employee, these determinations may be made based on a combination of a minimum range threshold and a minimum time threshold window, as shown in FIG. 3. In various embodiments, the minimum range threshold and/or the minimum time threshold window may be predetermined or modified based on various considerations. For example, in some embodiments, the minimum range threshold and/or the minimum time threshold may be set to the same values across several marketing regions, whereas in other embodiments it may be preferable to use different minimum range thresholds and/or minimum time threshold windows for different marketing regions. Typical values for the minimum threshold range may be 20 or 30 feet, for example, while typical values for the minimum time threshold window may be 5 or 10 seconds, for example. As will be appreciated by those of ordinary skill in the relevant art(s), the minimum threshold range and minimum time threshold window values may be chosen based on marketing data, regional data, etc.

In some embodiments, as previously discussed, the minimum threshold range may be the same as a maximum detection range between communication device 104 and one or more of communication devices 103.1-103.N., such as NFC embodiments, for example. In other embodiments, such as BLE and/or iBeacon embodiments, for example, the minimum threshold range may be based on a distance that is less than the maximum communications range between communication device 104 and one or more of communication devices 103.1-103.N.

Graph 300 represents a range measurement on the y-axis and a time measurement on the x-axis. The specific units are irrelevant, but graph 300 could represent typical units such as range in feet and time in seconds, for example. Graph 300 illustrates a relationship between range and time for three example interaction scenarios 302, 304, and 306. In example scenario 302, graph 300 shows that communication device 104 and a communication device 103 were never within the minimum threshold range of one another, although they were within a greater range of one another than the minimum threshold range for a duration that exceeded the minimum time threshold window. Furthermore, the opposite conditions are true for example scenario 304, in which communication device 104 and a communication device 103 were within the minimum threshold range of one another but not for a duration of time exceeding the minimum time threshold window. Finally, example scenario 306 satisfies both conditions. As a result, in an embodiment, if a customer visited a store and interacted with three store employees represented as example scenarios 302, 304, and 306, only the interaction with the store employee corresponding to example scenario 306 would be deemed as an interaction. In such a case, example scenario 306 would result in communication device 104 logging additional details associated with example scenario 306, such as a timestamp of the scenario, an employee identification number, the duration of the interaction, a store identifier, etc.

Figure 4A:
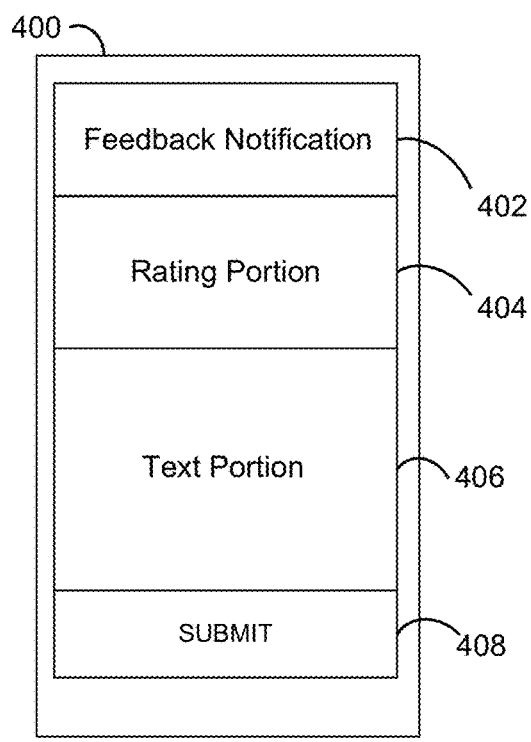
FIG. 4A illustrates an exemplary communication device screen 400, according to an embodiment.

FIG. 4A illustrates an image of an exemplary communication device screen 400, according to an embodiment. As previously discussed with reference to FIG. 2, in accordance with an embodiment, a communication device that has installed the feedback application is configured to detect and/or receive one or more trigger conditions when the customer leaves the store and/or purchases an item in the store. Communication device screen 400 is an example of a notification prompt that may be displayed at a communication device that has detected and/or received a trigger condition indicating that a customer has purchased an item at the store and/or left the vicinity of the store. In an embodiment, communication device screen 400 is an example of a notification screen that may be displayed on a suitable display device (e.g., display 212) implemented by communication device 104 and/or communication device 200, for example, as shown in FIGS. 1 and 2, respectively. In accordance with an embodiment, a customer may cancel the entry of feedback by selecting an appropriate "cancel" button accordingly. A cancel button is not shown in FIG. 4A for purposes of brevity.

As shown in FIG. 4A, communication device screen 400 may include several portions, such as feedback notification portion 402, feedback rating portion 404, text entry portion 406, and submit portion 408. Although FIG. 4A illustrates the various portions being arranged at various portions of communication device screen 400, various embodiments include feedback notification portion 402, feedback rating portion 404, text entry portion 406, and/or submit portion 408 having any suitable shape, design, and/or being displayed at any suitable location within communication device screen 400 relative to one another to facilitate soliciting feedback from a customer.

As shown in FIG. 4A, feedback notification portion 402 may include a prompt asking the customer how his shopping experience was at the store. Rating portion 404 may include any suitable rating that may be represented as, or reduced to, an equivalent numerical value, such as a star rating system, a sliding scale of numeric numbers, a grading system, etc. Rating portion 404 may enable a customer to select a desired rating via an appropriate interaction with the display (e.g., by tapping or touching the appropriate rating desired). Text portion 406 may enable a customer to enter comments or other textual descriptions related to the shopping experience. For example, a customer may utilize an appropriate user interface (e.g., user interface 210) to type the desired text. Submit portion 408 may allow a customer to submit the feedback information to another device, such as external computing device 112, for example, as shown in FIG. 1.

In an embodiment, the feedback data included in rating portion 404, the text included in text portion 406, and any other information that may have been logged during the customers shopping experience such as identified interactions and their corresponding employee identification numbers, interaction durations, etc., may be sent another device upon the customer selecting (e.g., by tapping and/or touching) submit portion 408.

Figure 4B:
FIG. 4B illustrates an image of an exemplary communication device application screen, according to an embodiment.

FIG. 4B illustrates an image of an application screen, according to an embodiment. Using the previous example discussed with reference to FIG. 4A, the customer is asked how her experience was shopping today, and is provided a star rating portion as well as a comment portion to provide the desired feedback. Furthermore, as shown in FIG. 4B, once the customer provides the desired feedback by selecting the appropriate number of stars and/or typing comments or suggestions, the customer may select the "submit" box with an appropriate gesture and this information submitted to another device, such as external computing device 112, for example, as shown in FIG. 1.

Figure 4C:
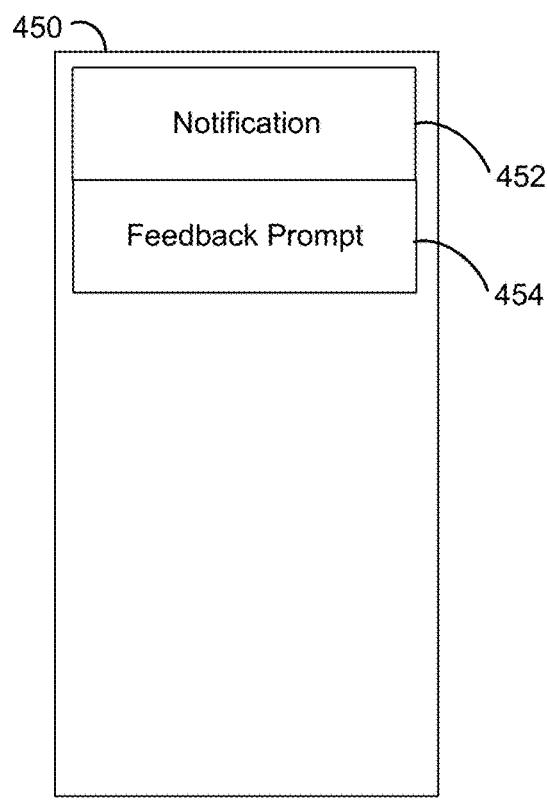
FIG. 4C illustrates an exemplary communication device screen 450, according to an embodiment.

FIG. 4C illustrates an exemplary communication device screen 450, according to an embodiment. As previously discussed with reference to FIG. 1, a communication device that has installed the feedback application may be configured to detect when the customer has completed his shopping visit to a particular store, which may result in a feedback notification 452 being displayed to the user. In some embodiments, notification 452 may be displayed in the foreground as opposed to the background to notify the customer that the application has detected that he has finished shopping at the store. Shortly after notification 452 is displayed (e.g., one or two seconds later), embodiments include a feedback notification prompt 454 being displayed together, or separately, from the notification 452.

Figure 4D:
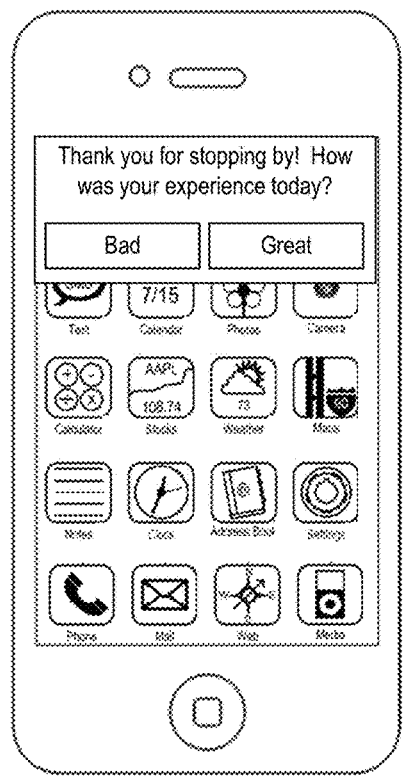
FIG. 4D illustrates an image of an exemplary communication device application screen, according to an embodiment.

FIG. 4D illustrates an image of an exemplary communication device application screen, according to an embodiment. Using the previous example discussed with reference to FIG. 4C, the customer is asked how her experience was shopping today, and is provided a prompt to give a condensed version of feedback rating compared to the full feedback shown in FIGS. 4A- and 4B, for example.

For example, feedback notification prompt 454 may include a simple binary question regarding whether the customer's experience was "great" or "bad." Again, as will be appreciated by those of ordinary skill in the relevant art(s), any text and/or prompt layout may be utilized to facilitate the collection of this abbreviated form of customer feedback. For example, feedback notification prompt 454 may include the 5 stars as shown in FIG. 4B without the text portion, thereby allowing the customer to quickly select a star number that is submitted once selected by the user. To provide another example, feedback notification prompt 454 may include three options such as "good," average" and "bad," etc. In various embodiments, the selection of the appropriate feedback choice by the customer results in the submitted feedback being sent to another device, such as external computing device 112, for example, as previously discussed with respect to FIG. 1.

In some embodiments, this abbreviated feedback may be used to generate specific reports separate from reports generated from the full version of feedback gathered, for example, using the method previously discussed with reference to FIGS. 4A-B. In other embodiments, a numeric value may be assigned to the abbreviated feedback to incorporate this feedback with the full version of feedback that may also be collected by an external device. For example, a feedback rating of "good" may be associated with the same value as a four-star rating, using the previous example in FIG. 2B, whereas a "bad" feedback rating may be associated with a two-star rating.

The following discussion of exemplary reports with reference to FIGS. 5-8 refers to store employee ranks among individual stores based on averaged customer feedback ratings. In accordance with various embodiments, an employee's ranking among other store employees may be determined from a combination of a number of reviews and the ratings obtained for each of the customer reviews. For example, an external computing device, such as external computing device 112, for example, as shown in FIG. 1, may assign a numeric value to each star and average these numbers from each customer review to determine an average feedback rating value for each employee. Then, external computing device 112 may rank store employees with the same average feedback rating higher than other store employees with a lesser number of customer reviews to rank each store employee in the store accordingly.

Figure 5:
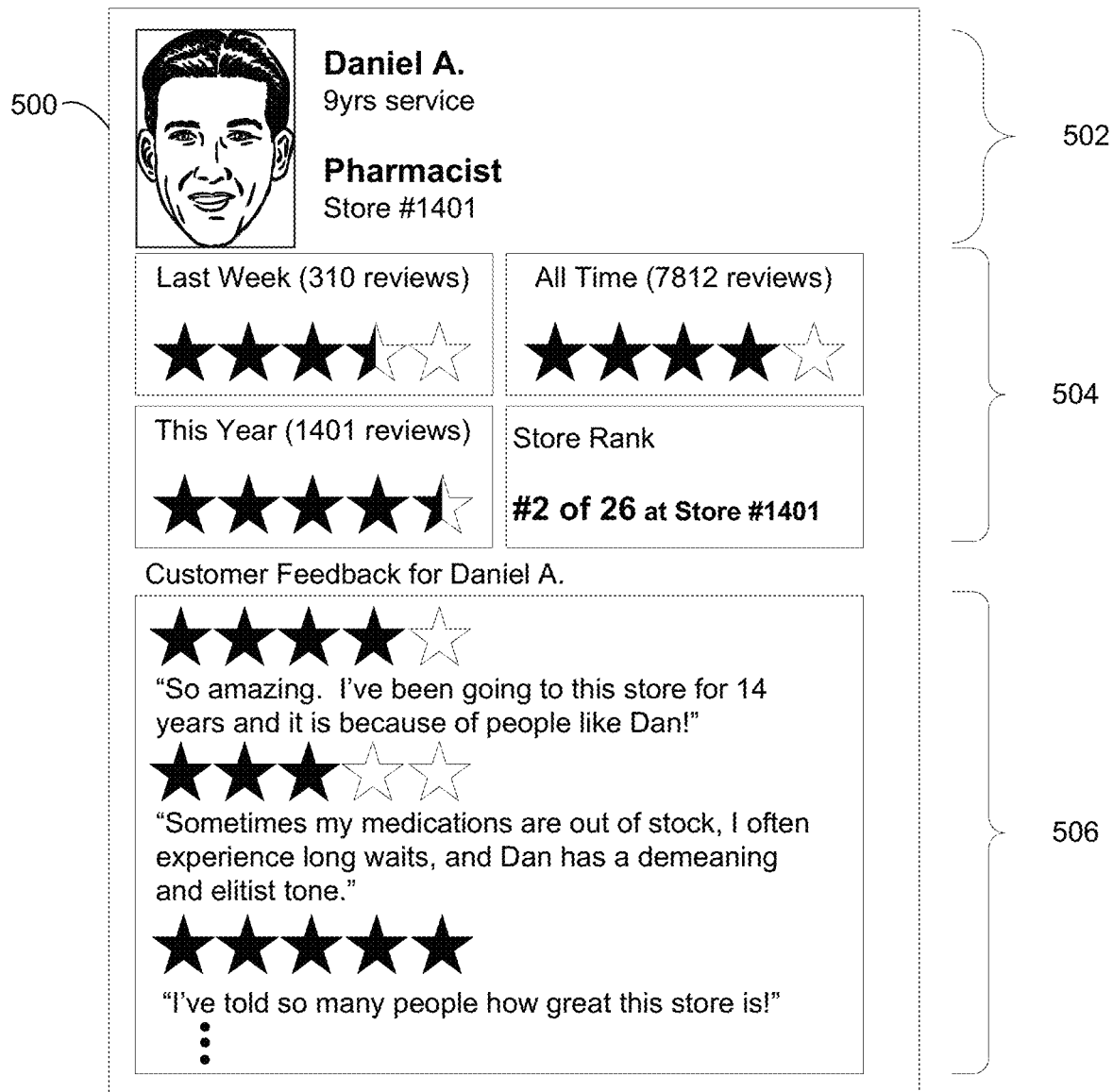
FIG. 5 illustrates an exemplary report 500, according to an embodiment.

FIG. 5 illustrates an exemplary report 500, according to an embodiment. In an embodiment, report 500 may be generated by an external computing device, such as external computing device 112, for example, as shown in FIG. 1. In various embodiments, report 500 may be displayed on any suitable computing device, such as a tablet computer, a personal computer, a smartphone, etc. In various embodiments, external computing device 112 may be configured to format the data included in report 500 such that a corresponding suitable computing device may open and display the report in accordance with a respective application and/or program. As will be appreciated by those of ordinary skill in the relevant art(s), the layout and graphical representation of report 500 is for illustrative purposes, and may utilize any suitable design or layout to provide employee feedback data without departing from the spirit and scope of the present disclosure.

As previously discussed, external computing device 112 may receive feedback data from a customer along with any comments the customer may provide about her experience at a particular store. Over time, external computing device 112 may receive feedback from several employees over several stores from multiple customers. In various embodiments, external computing device 112 may be configured to separate this feedback data on a per-store employee basis. As shown in FIG. 5, example report 500 includes feedback data for store employee "Daniel A.," and may additionally include employee information associated with this store employee in portion 502, such as a profile picture, a job title, the employee's store (e.g., store #1401), how long the store employee has worked at a particular store (e.g., 9 years), etc.

In various embodiments, report 500 may include feedback data and/or rankings determined from averaged feedback data received from one or more customers that interacted with Daniel A. over various periods of time. As shown in portion 504, report 500 indicates feedback data averaged over the past week from 310 customer reviews of 3.5 stars, each of which had interacted with Daniel A. Furthermore, portion 504 also indicates that customer feedback data averaged over 1401 customer reviews in the past year was 4.5 stars, and the customer feedback data averaged over the entirety of all 7812 customer reviews is 4 stars.

Because external computing device 112 may receive customer feedback data from multiple store employees and/or multiple stores in a retail chain, various embodiments include external device 112 ranking each store employee according to their respective average feedback data scores. These rankings may be based on average customer feedback data from any suitable time period, such as the past week, month, year, all time, etc. As shown in report 500, Daniel A. ranks second out of 26 employees at store #1401, which again, could be based on average customer feedback scores from the past week, year, all time, etc.

In various embodiments, portion 506 of report 500 may include a listing of the customer feedback ratings and/or any comments entered by each customer that interacted with Daniel A. As will be appreciated by those of ordinary skill in the relevant art(s), the customer feedback data presented in portion 506 may be displayed using any suitable organization, such as the most recent feedback first, the most positive feedback first, etc. The customer feedback presented in portion 506 may also be filtered in accordance with various embodiments such that only customer feedback in the last day, week, month, etc. is displayed in report 500.

Because report 500 includes both a rating and comments linked to specific employee interactions with customers, report 500 may be utilized as a valuable tool by store management. For example, a store manager or other higher-level store employee may review report 500 for each employee at the store to determine customer feedback trends or reoccurring issues. Based on the customer feedback ratings and/or comments, store management may determine whether additional intervention, supervision, and/or disciplinary measures are required. Furthermore, the customer feedback ratings may include information regarding other store functions, particularly those pertaining to the store employee. Therefore, report 500 may provide management with insight as to how various parts of a store are functioning, such as whether items are being restocked, if the store is being adequately cleaned, whether store employees have good customer service skills, etc.

In various embodiments, employee ratings may be used to incentivize store employees. Since the store employee's feedback rating may be automatically calculated based on gathered customer feedback information without user interaction, additional automated tasks may be linked to these ratings. Embodiments include a spot bonus award system being implemented that provides an automated spot bonus to an employee when the employee's feedback rating exceeds a set threshold. To provide an illustrative example, an store employee could be awarded a spot bonus every month when the previous month average customer feedback rating meets or exceeds 4 out of 5 stars, or a tiered spot bonus system based on increasing levels of feedback ratings. In an embodiment, external computing system 112 may be configured to communicate with one or more payroll systems to provide an accounting computing system customer feedback ratings for one or more store employees, thus facilitating disbursement of spot bonuses with little or no user intervention.

Figure 6:
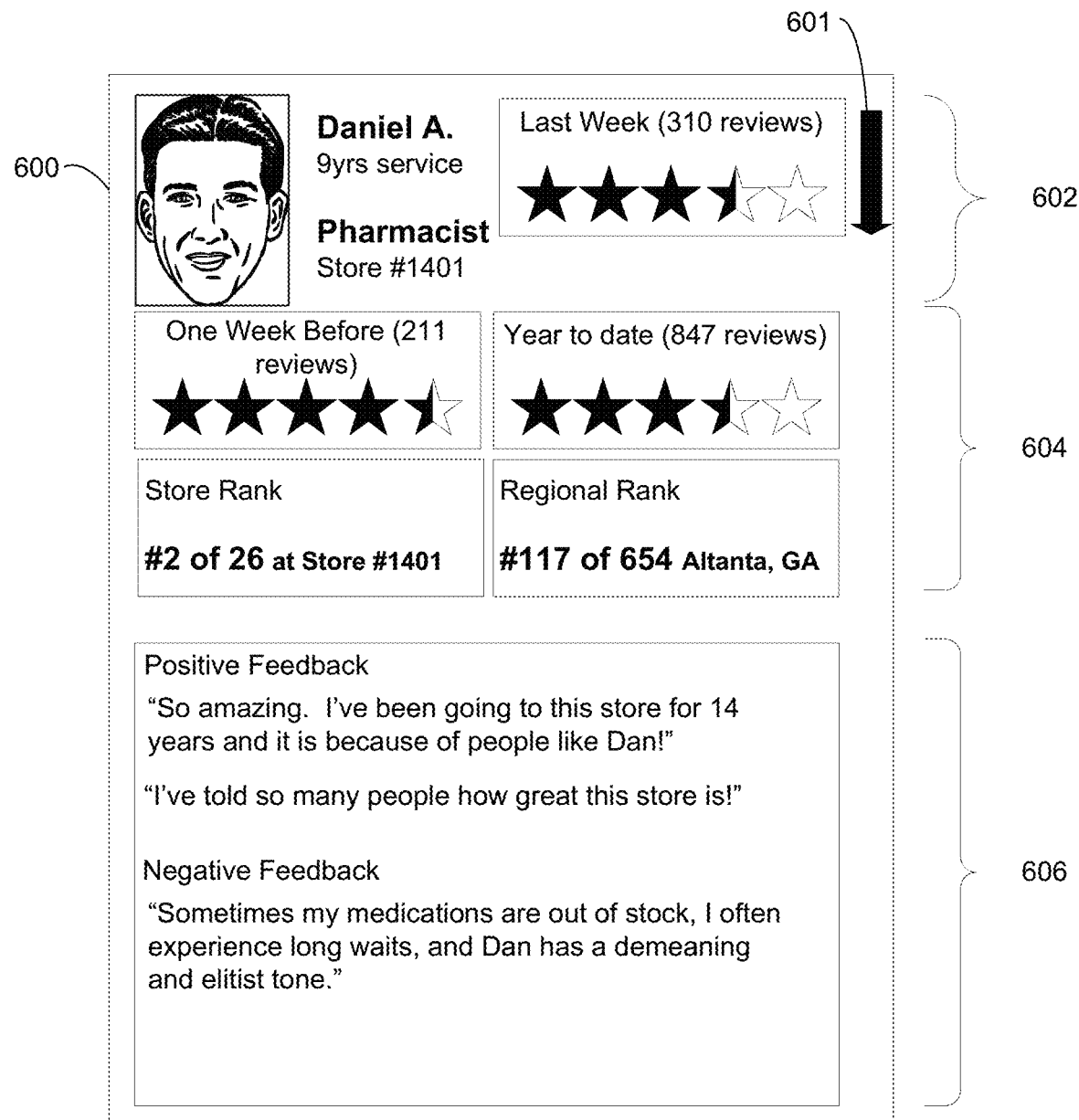
FIG. 6 illustrates an exemplary report 600, according to an embodiment.

FIG. 6 illustrates an exemplary report 600, according to an embodiment. In various embodiments, report 600 may be displayed on any suitable computing device, such as a tablet computer, a personal computer, a smartphone, etc. In various embodiments, an external computing device receiving feedback data from customers, such as external computing device 112, for example, as shown in FIG. 1, may generate various types of reports targeted to various levels of stores employees and/or management. As will be appreciated by those of ordinary skill in the relevant art(s), the layout and graphical representation of report 600 is for illustrative purposes, and may utilize any suitable design or layout to provide employee feedback data without departing from the spirit and scope of the present disclosure.

Report 600 is an example of a report that may be targeted towards a store employee as opposed to a store manager. Similar to report 500, report 600 also includes information regarding the employee, his title, experience, and picture, as shown in portion 602 of report 600. However, report 600 also includes the customer feedback averaged over the last week for the employee to review in portion 602, and may also include a trend indication based on whether the most recent week of customer feedback was better or worse than ratings in the prior week, as indicated by downward arrow 601.

In addition, report 600 may include a portion 604 that includes feedback ratings based on other customer feedback averaging periods, such as a running year-to-date rating, a prior week rating, a prior month rating, etc. Furthermore, report 600 may include other rankings that may be important to an individual store employee, such as the store employees current ranking compared to other employees in the store, a regional ranking comparing an average store rating among several stores in a regional market, etc.

In various embodiments, report 600 may include a portion 606 that separates comments from positive and negative customer feedback. For example, positive feedback may be pulled from several customer feedback comments associated with a star rating of 5, while negative feedback may be pulled from several customer feedback comments associated with a star rating of 1. To provide another example, the positive and negative feedback comments may be randomly pulled from several customer feedback comments associated with star ratings greater than and less than 2.5 stars, respectively, using the example 5-star rating system used throughout the disclosure.

In various embodiments, external computing device 112 may send report 600 to individual store employees via a work and/or personal email. As will be appreciated by those of ordinary skill in the art, information in portions 602, 604, and/or 606 may be condensed and/or modified based on the recipient of report 600 and/or the method of delivery of report 600. For example, report 600 may present each store employee with a simple and short summary of their current customer feedback submissions from various interactions with customers, such as only displaying two or three positive and negative reviews in an emailed report 600 sent to the store employee. On the other hand, a store manager may view report 600 on a workstation at the store to see all customer feedback for a given feedback averaging period.

Figure 7:
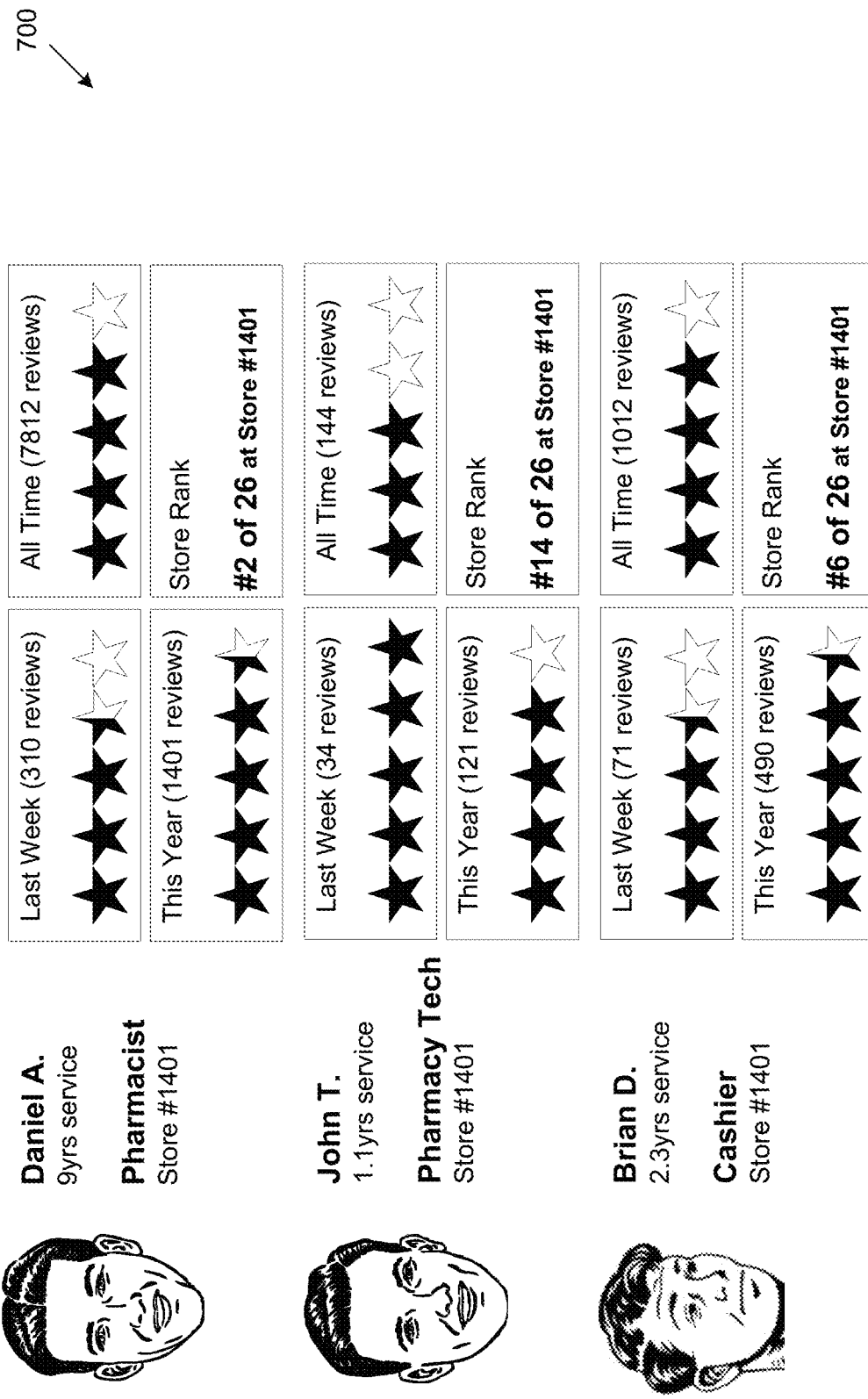
FIG. 7 illustrates an exemplary report 700, according to an embodiment.

FIG. 7 illustrates an exemplary report 700, according to an embodiment. Again, external computing device 112 may receive customer feedback from multiple store employees over multiple store locations. As will be appreciated by those of ordinary skill in the relevant art(s), the layout and graphical representation of report 700 is for illustrative purposes, and may utilize any suitable design or layout to provide employee feedback data without departing from the spirit and scope of the present disclosure. In accordance with various embodiments, external computing device 112 may separate store employee feedback data according to each individual store. As shown in report 700, each store employee Daniel A, John T., and Brian D. are store employees at store #1401. Each individual store employee report may be similar or identical to report 500. However, various embodiments include external computing device 112 generating report 700 by aggregating and displaying feedback data for several (or all) store employees within a particular store. In this way, a store manager or other higher-level store employee may quickly compare the customer feedback ratings of each store employee, and see which store employees are doing better than others at a quick glance.

Figure 8:
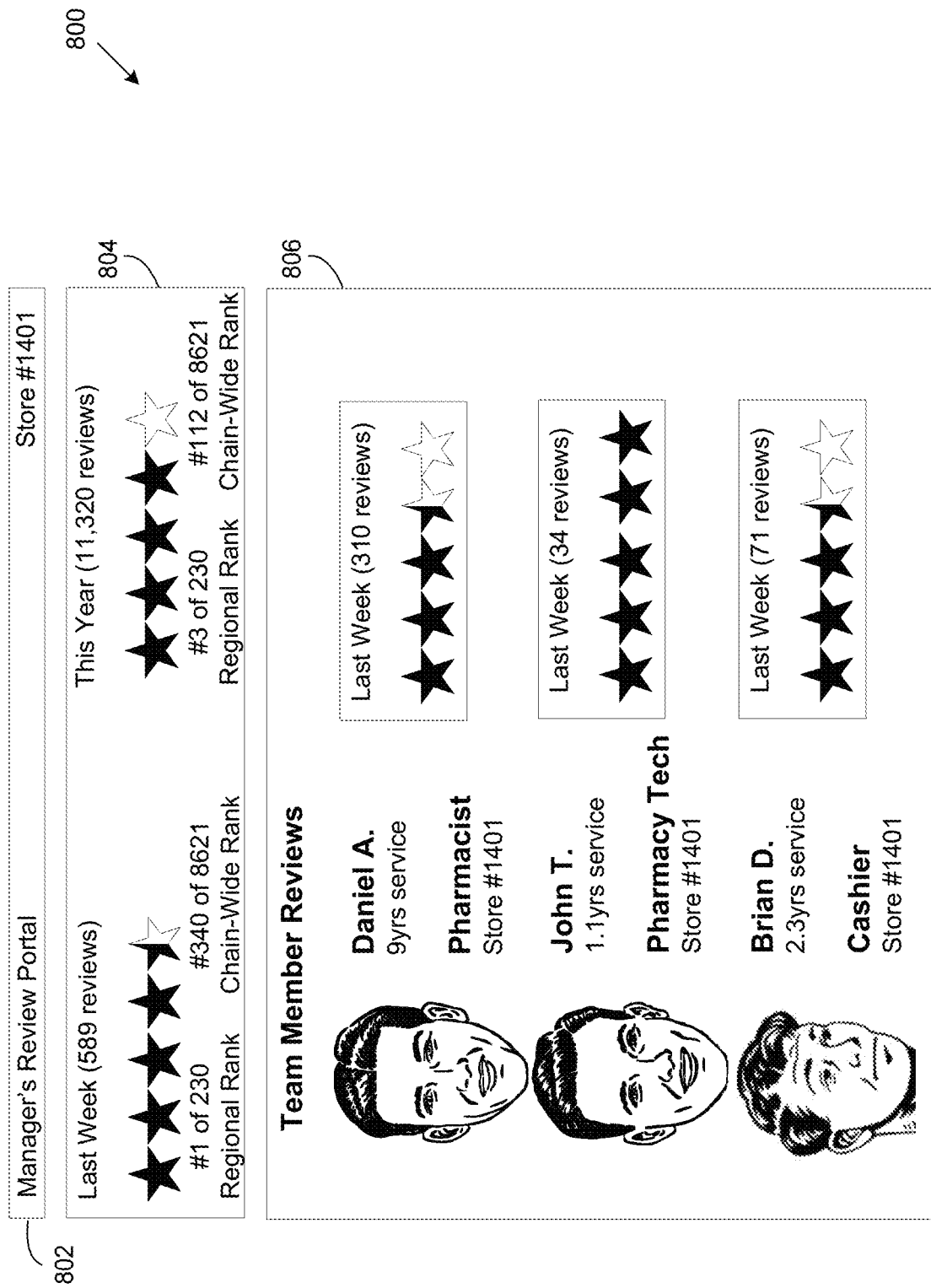
FIG. 8 illustrates an exemplary report 800, according to an embodiment.

FIG. 8 illustrates an exemplary report 800, according to an embodiment. Again, external computing device 112 may receive customer feedback from multiple store employees over multiple store locations for a given chain of stores. In accordance with various embodiments, external computing device 112 may combine averaged customer feedback for individual employees as well as customer feedback averaged over multiple stores or regions to provide insight regarding how stores within a region and/or chain rank compared to one another.

For example, report 800 includes portions 802, 804, and 806. Portion 802 may identify a particular store for which the feedback information is being presented. Portion 806 may identify one or more employees and their respective average customer feedback ratings over some period of time, such as the last week, for example, as illustrated in FIG. 8.

In addition, portion 804 may include information that ranks store regions or entire chains of stores based on an aggregation of averaged store employee feedback ratings. For example, by averaging the store employees at a particular store, such as store #1401, for example, external computing device 112 may determine a numeric value, such as a value from 1 to 5, for example, based on the star rating example used throughout the disclosure. External computing device 112 may repeat this process for multiple stores, and then average these numeric values over a specified region, such as a market region or the entire chain of stores, for example. Portion 804 provides an illustration of an example of displaying regional and chain-wide store rankings in this way. In the example shown in FIG. 8, the comparison between store #1401 and other stores in its same region and the entire chain of stores is made using averaged customer feedback for employees in the past week as well as the year to date. In various embodiments, these rankings may be calculated for any suitable time period. As was previously discussed with reference to employee rankings, external computing device 112 may also utilize a combination of total number of customer reviews as well as average customer feedback ratings to rank stores within any suitable specified group of stores, such as stores within the same region, stores within the entire chain, etc.

In this way, embodiments include generating reports to provide information that is useful to different levels of management within a chain, such as shift managers, store managers, regional managers, vice presidents of chains, etc. Since embodiments include external computing device 112 aggregating averaged feedback data having varying granularities, each level of management may select an appropriate report to view that best suits their management interests and goals.

As will be appreciated by those of ordinary skill in the relevant art(s), the reports shown in FIGS. 5-8 may be tailored and/or customized based on the target viewer. For example, a report may be generated for a market vice president including only stores that the market vice president manages, only top ranking employees from several stores, etc.

Figure 9:
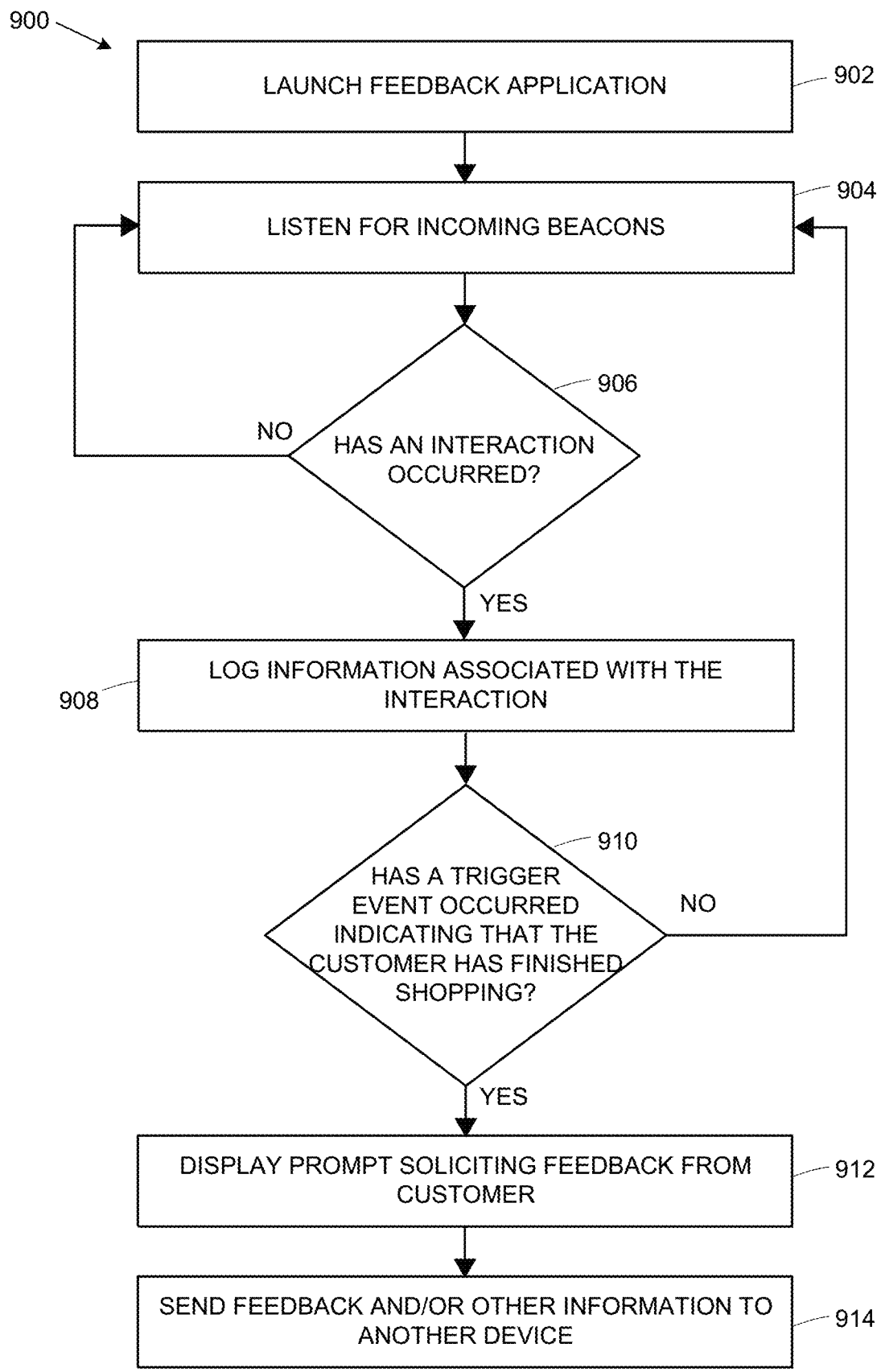
FIG. 9 illustrates a method flow 900, according to an embodiment.

FIG. 9 illustrates a method flow 900, according to an embodiment. In an embodiment, method 900 may be implemented by any suitable device, such as communication device 104 and/or communication device 200, for example, as shown in FIGS. 1 and 2, respectively. In an embodiment, method 900 may be performed by one or more processors, applications, and/or routines, such as any suitable portion of CPU 202 and/or GPU 204, which may perform method 900 executing instructions, algorithms, routines, and/or code in conjunction with feedback application module 208, for example, as shown in FIG. 2.

Method 900 starts when a feedback application is launched by one or more processors (block 902), which may be part of a first communication device. This application could include, for example, an application executed by CPU 202 and/or GPU 204 reading instructions stored in application module 208, for example, as shown in FIG. 2. In an embodiment, the application may be started without user intervention and may run as one or more background processes of a communication device, such as a smartphone, for example. As previously discussed with reference to FIGS. 1 and 2, the application may be launched upon a communication device detecting its proximity to a particular store.

Once the feedback application has been launched and is running (block 902) method 900 includes one or more processors continuing to listen for incoming beacons transmitted from other communication devices (block 904). This functionality may be supported, for example, by one or more processors working in conjunction with one or more communication units. For example, CPU 202 and/or GPU 204 may communicate with communication unit 214, as shown in FIG. 2, to receive and/or process information transmitted from one or more communication devices, such as communication devices 103.1-103.N.

Method 900 includes one or more processors determining whether an interaction between the first communication device and a second communication device has occurred (block 906). The one or more processors could include, for example, CPU 202 and/or GPU 204 determining whether communication device 200 (which may be an embodiment of communication device 104) has interacted with one or more communication devices 103.1-103.N. Again, this determination may be made by CPU 202 and/or GPU 204 determining whether interactions have occurred based on whether conditions have been met, such as communication device 104 and any of communication devices 103.1-103.N being within a threshold range of one another for a threshold duration, for example, as previously discussed with reference to FIG. 3. If the one or more processors determine that an interaction has occurred, then method 906 continues (block 908). Otherwise, method 900 reverts back to continue listening for incoming beacons (block 904) and determining whether interactions have occurred based on transmission parameters included in the received beacons (block 906).

Method 900 includes one or more processors logging details of the interaction, such as an employee ID associated with the interaction, the duration of the interaction, the distance between the customer and employee during the interaction, a store identification number, etc. (block 908). This logging could be made, for example, by CPU 202 and/or GPU 204 storing data transmitted over the beacon that is processed by communication unit 214 and stored in memory 206, for example, as shown in FIG. 2.

Method 900 includes one or more processors determining whether a trigger event has occurred indicating the customer has finished shopping (block 910). In some embodiments, this determination may be made at the communication device that has received the beacons and determined whether one or more interactions have occurred between the customer and one or more store employees, such as communication device 104, for example, as shown in FIG. 1 (block 910).

Examples of the communication device determining the trigger event may include one or more processors detecting rapid changes in the red value in the RGB spectrum in conjunction with a camera unit. This could include, for example, CPU 202 and/or GPU 204 determining that communication device has been scanned by a laser barcode scanner displayed as part of a loyalty rewards program via communications with camera unit 216, for example, as previously discussed in reference to communication devices 104 and 200, for example, as shown in FIGS. 1 and 2, respectively.

In other embodiments, the determination of whether a trigger event has occurred may be made by another device (block 910). For example, external computing device 112 may determine that communication device 104 has left the vicinity of the store, with or without purchasing an item. As previously discussed with reference to FIGS. 1 and 2, external computing device 112 may make such a determination based on any suitable techniques, such as comparing a location received from communication device 104 to a geofence, utilizing information associated with other beacon device transmissions received from communication device 104, etc. If a trigger event is detected (block 910) then method 900 continues (block 912). Otherwise, method 900 reverts back to continue listening for incoming beacons (block 904), determining whether interactions have occurred based on transmission parameters included in the received beacons (block 906), and logging relevant information when interactions have occurred (block 908). In this way, embodiments of method 900 include storing interactions between the customer and several employees during the customer's shopping experience until a trigger event is received and/or detected (block 910).

Method 900 includes one or more processors displaying a prompt soliciting feedback from the customer (block 912). In an embodiment, the one or more processors may include CPU 202 and/or GPU 204, for example, as shown in FIG. 2. In an embodiment, the prompt may be similar to the prompts as shown in FIGS. 4A-4B, for example, which may be displayed on part of a suitable communication device.

Method 900 includes one or more processors sending the feedback and/or other information to another device (block 914). In an embodiment, the one or more processors may include CPU 202 and/or GPU 204, for example, as shown in FIG. 2. In an embodiment, the feedback and/or other information may include information logged by the one or more processors (block 908) and/or information entered by the customer in response to the displayed feedback prompt (block 912). In an embodiment, the feedback and/or other information may be sent from one communication device to another communication device, such as from communication device 104 to external computing device 112, for example, as shown in FIG. 1.

Figure 10:
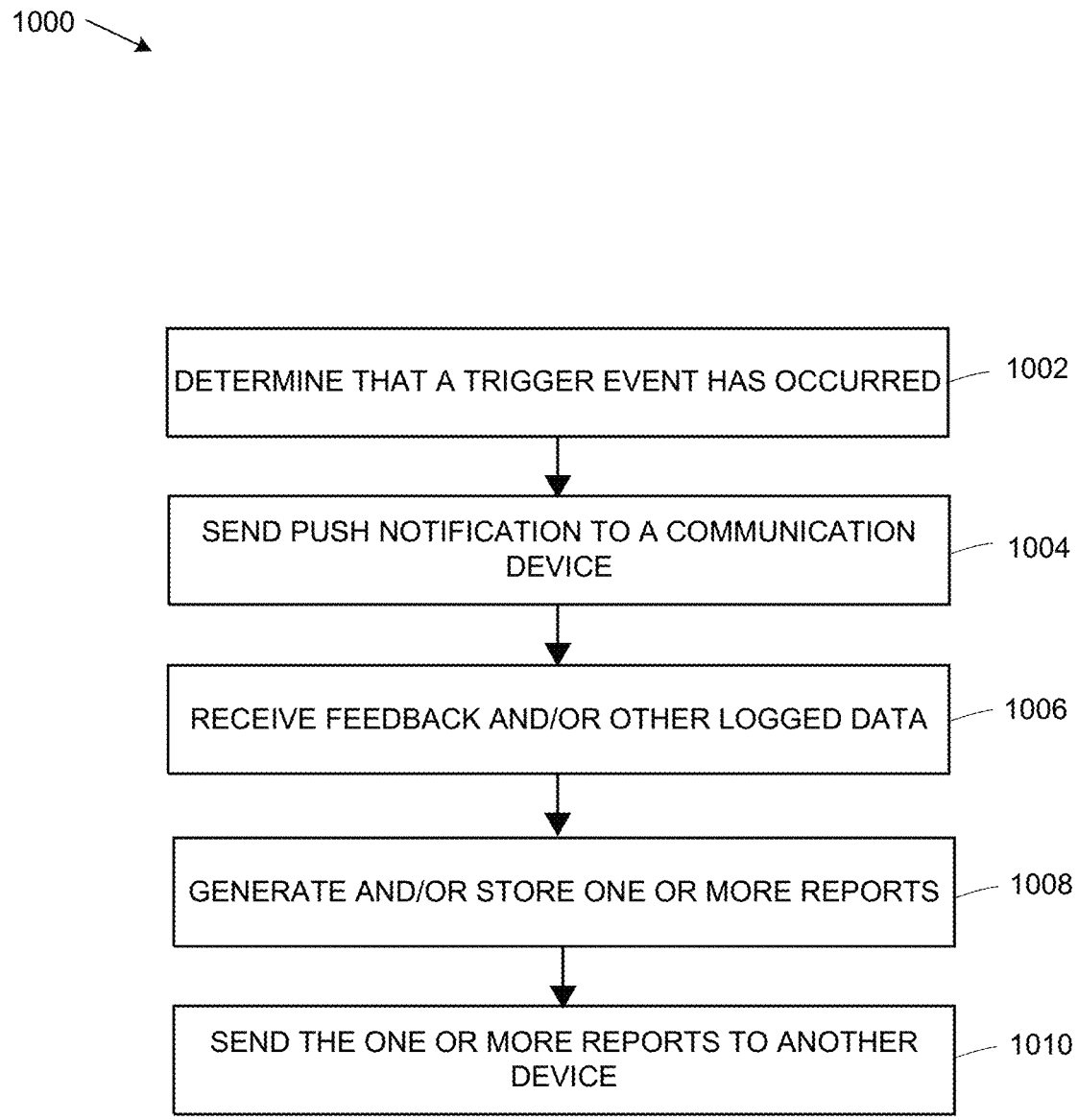
FIG. 10 illustrates a method flow 1000, according to an embodiment.

FIG. 10 illustrates a method flow 1000, according to an embodiment. In an embodiment, method 1000 may be implemented by any suitable device, such as external computing device 112, for example, as shown in FIG. 1. In an embodiment, method 1000 may be performed by one or more processors, applications, and/or routines, such as any suitable portion of CPU 202 and/or GPU 204, which may perform method 1000 executing instructions, algorithms, routines, and/or code in conjunction with feedback application module 208, for example, as shown in FIG. 2.

Method 1000 may include one or more processors determining whether a trigger event has occurred indicating the customer has finished shopping (block 1002). In various embodiments, the determination may be based on a location of another communication device associated with the customer, such as communication device 104, for example, as shown in FIG. 1. In accordance with such embodiment, the one or more processors may determine that the customer's communication device has left the vicinity of the store, with or without purchasing an item. Again, external computing device 112 may make this determination based on any suitable techniques, such as comparing a location received from communication device 104 to a geofence, utilizing information associated with other beacon device transmissions received from communication device 104, etc.

Method 1000 may include one or more processors sending a push notification to another communication device (block 1004). In various embodiments, the push notification may be sent from an external communication device to the communication device associated with the customer. For example, the push notification may be generated at external computing device 112 and sent to communication device 104, as shown in FIG. 1.

Method 1000 may include one or more processors receiving feedback information and/or other data logged by the customer's communication device (block 1006). In various embodiment, this feedback information may be entered by the customer in response to a feedback notification that is displayed when the push notification sent from external computing device 112 (block 1004) is received at the customer's communication device, such as communication device 104, for example, as shown in FIG. 1. For example, the feedback data and/or other logged information may include data previously described in method 900 (block 914), as shown in FIG. 9.

Method 1000 may include one or more processors generating and/or storing one or more reports (block 1008) based on the feedback received from the customer's communications device (block 1006). For example, the reports may correspond to the reports previously discussed with reference to FIGS. 5-8. In various embodiments, the reports generated (block 1008) may include an aggregation of averaged feedback ratings from several customers over several retail stores in a chain. Thus, embodiments include method 1000 generating reports (block 1008) having individual store employee feedback, store employee feedback averaged over a single store, several averaged stores within a region and/or chain, etc.

Method 1000 may include one or more processors sending the reports to another device (block 1010). In some embodiments, the reports may be sent from the device that generated the reports, such as external computing device 112, for example, as showing in FIG. 1. For example, external computing device 112 may send reports as part of an email and/or email attachment to store employees directly, to store managers, to regional managers, etc.

In other embodiments, method 1010 does not send the reports to another device (block 1010 is omitted), but other devices may access the reports stored on external computing device 112. For example, in accordance with such embodiments, method 1000 may include external device 112 storing one or more generated reports (block 1008) and allowing another device, such as an employee workstation computer, an accounting system computer, etc., access to the generated reports. In this way, external computing device 112 may act as a repository for generated reports (block 1008).

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, one of ordinary skill in the art will recognize that numerous alternative embodiments could be implemented, using either current technology or technology developed after the filing date of this patent application.

What is claimed is:

1. A method, comprising:
   identifying, by a mobile computing device, an interaction between a customer who is associated with the mobile computing device and a store employee who is associated with a first wireless communication device when the mobile computing device is within a threshold range of the first wireless communication device for a threshold period of time;
   receiving, by the mobile computing device, an employee identification number transmitted from the first wireless communication device during the interaction;
   logging, by the mobile computing device, responsive to the mobile computing device identifying the interaction, the transmitted employee identification number identifying the store employee involved in the interaction transmitted from the first wireless communication device to the mobile computing device during the interaction;
   generating, by the mobile computing device, in response to the identified interaction between the customer and the store employee, a feedback prompt soliciting employee feedback;
   receiving, by the mobile computing device, feedback regarding the identified store employee entered by the customer in response to the feedback prompt; and
   transmitting, by the mobile computing device, the feedback entered by the customer.

2. The method of claim 1, wherein the act of identifying the interaction between the customer and the store employee comprises:
   determining a power level of a signal transmitted by the first wireless communication device in accordance with a personal area network (PAN) communication protocol; and
   tracking the power level of the signal to verify that the power level of the signal does not fall below a threshold power level during the threshold period of time.

3. The method of claim 1, further comprising:
   upon detecting that the customer has entered a vicinity of a physical store location, executing a background application installed on the mobile computing device to listen for first transmission parameters transmitted from the first wireless communication device.

4. The method of claim 3, further comprising:
   detecting that the customer has entered the vicinity of the physical store location based upon a comparison of a geographic location of the mobile computing device to a geofenced area that is associated with the physical store location.

5. The method of claim 3, further comprising:
   detecting that the customer has entered the vicinity of the physical store location using information received as part of second transmission parameters transmitted by a second wireless computing device that uniquely identify the physical store location.

6. The method of claim 5, wherein the second transmission parameters are transmitted by the second wireless computing device and received by the mobile computing device in accordance with a personal area network (PAN) communication protocol.

7. The method of claim 1, wherein the feedback entered by the customer includes one or more of:
   a numeric feedback rating; and
   text.

8. A mobile computing device, comprising:
   one or more processors configured to:
   identify, an interaction between a customer who is associated with the mobile computing device and a store employee who is associated with a first wireless communication device when the mobile computing device is within a threshold range of the first wireless communication device for a threshold period of time;
   receive, an employee identification number transmitted from the first wireless communication device during the interaction;
   log, responsive to identifying the interaction, the transmitted employee identification number identifying the store employee involved in the interaction transmitted from the first wireless communication device to the mobile computing device during the interaction; and
   generate, in response to the identified interaction between the customer and the store employee, a feedback prompt soliciting employee feedback;
   a user interface configured to receive feedback regarding the identified store employee entered by the customer in response to the feedback prompt; and
   a communication unit configured to transmit the feedback entered by the customer.

9. The mobile computing device of claim 8, wherein the one or more processors are further configured to identify the interaction between the customer and the store employee by determining a power level of a signal transmitted by the first wireless communication device in accordance with a personal area network (PAN) communication protocol, and tracking the power level of the signal to verify that the power level of the signal does not fall below a threshold power level during the threshold period of time.

10. The mobile computing device of claim 8, wherein the one or more processors are further configured to, upon detecting that the customer has entered a vicinity of a physical store location, execute a background application installed on the mobile computing device to listen for first transmission parameters transmitted from the first wireless communication device.

11. The mobile computing device of claim 10, wherein the one or more processors are further configured to detect that the customer has entered the vicinity of the physical store based upon a comparison of a geographic location of the mobile computing device to a geofenced area that is associated with the physical store location.

12. The mobile computing device of claim 10, wherein the one or more processors are further configured to detect that the customer has entered the vicinity of the physical store location using information received as part of second transmission parameters transmitted by a second wireless computing device that uniquely identify the physical store location.

13. The mobile computing device of claim 12, wherein the communication unit is further configured to receive the second transmission parameters transmitted by the second wireless computing device in accordance with a personal area network (PAN) communication protocol.

14. The mobile computing device of claim 8, wherein the feedback entered by the customer includes one or more of:
 a numeric feedback rating; and
 text.

15. A system, comprising:
 a first wireless communication device associated with a store employee; and
 a mobile computing device, associated with a customer, configured to:
 identify, an interaction between a customer who is associated with the mobile computing device and a store employee who is associated with a first wireless communication device when the mobile computing device is within a threshold range of the first wireless communication device for a threshold period of time;
 receive, an employee identification number transmitted from the first wireless communication device during the interaction;
 log, responsive to the mobile computing device identifying the interaction, the transmitted employee identification number identifying the store employee involved in the interaction transmitted from the first wireless communication device to the mobile computing device during the interaction;
 generate, in response to the identified interaction between the customer and the store employee, a feedback prompt soliciting employee feedback;
 receive feedback regarding the identified store employee entered by the customer in response to the feedback prompt being displayed by the mobile computing device; and
 transmit the feedback entered by the customer.

16. The system of claim 15, wherein the mobile computing device is further configured to identify the interaction between the customer and the store employee by determining a power level of a signal transmitted by the first wireless communication device in accordance with a personal area network (PAN) communication protocol, and tracking the power level of the signal to verify that the power level of the signal does not fall below a threshold power level during the threshold period of time.

17. The system of claim 15, wherein the mobile computing device is further configured to, upon detecting that the customer has entered a vicinity of a physical store location, execute a background application installed on the mobile computing device to listen for first transmission parameters transmitted from the first wireless communication device.

18. The system of claim 17, wherein the mobile computing device is further configured to detect that the customer has entered the vicinity of the physical store based upon a comparison of a geographic location of the mobile computing device to a geofenced area that is associated with the physical store location.

19. The system of claim 17, wherein the mobile computing device is further configured to detect that the customer has entered the vicinity of the physical store location using information received as part of second transmission parameters transmitted by a second wireless computing device that uniquely identify the physical store location.

20. The system of claim 19, wherein the mobile computing device is further configured to receive the second transmission parameters transmitted by the second wireless computing device in accordance with a personal area network (PAN) communication protocol.

\* \* \* \* \*